(12) United States Patent
Sullivan

(10) Patent No.: US 9,635,635 B2
(45) Date of Patent: *Apr. 25, 2017

(54) GENERATION AND MANAGEMENT OF NETWORK CONNECTIVITY INFORMATION

(71) Applicant: Comcast Cable Communications, LLC, Philadelphia, PA (US)

(72) Inventor: Patrick F. Sullivan, Des Plaines, IL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,685

(22) Filed: Sep. 28, 2015

(65) Prior Publication Data

US 2016/0095081 A1 Mar. 31, 2016

Related U.S. Application Data

(63) Continuation of application No. 13/736,172, filed on Jan. 8, 2013, now Pat. No. 9,178,769.

(51) Int. Cl.
| | | |
|---|---|---|
| H04W 64/00 | (2009.01) | |
| H04L 12/24 | (2006.01) | |
| H04W 84/18 | (2009.01) | |
| H04W 88/02 | (2009.01) | |

(52) U.S. Cl.
CPC .......... *H04W 64/00* (2013.01); *H04L 41/12* (2013.01); *H04W 84/18* (2013.01); *H04W 88/02* (2013.01); *Y04S 40/164* (2013.01)

(58) Field of Classification Search
CPC ....... H04L 41/12; H04L 41/14; H04L 41/145; H04L 45/02; Y04S 40/164
See application file for complete search history.

(56) References Cited

U.S. PATENT DOCUMENTS

| | | | |
|---|---|---|---|
| 6,675,009 B1* | 1/2004 | Cook | H04W 64/00 455/420 |
| 9,178,769 B2* | 11/2015 | Sullivan | H04L 41/12 |
| 2003/0204509 A1* | 10/2003 | Dinker | G06F 17/30575 |
| 2007/0047491 A1* | 3/2007 | Dutta | H04W 36/32 370/331 |
| 2009/0070455 A1* | 3/2009 | Cervantes | H04L 41/069 709/224 |
| 2013/0133023 A1* | 5/2013 | Burstein | G06F 21/00 726/1 |

* cited by examiner

Primary Examiner — Chi H Pham
Assistant Examiner — Weibin Huang
(74) Attorney, Agent, or Firm — Ballard Spahr LLP

(57) ABSTRACT

Aspects of the disclosure relate to generation of network topology information for a network of assets, and management of such information. The management can comprise analysis and/or diagnostics of topology condition of a plurality of assets. In addition or in the alternative, the management can comprise consolidation of at least a portion of the network topology information in a data layer of the network of assets, or a network functionally coupled thereto. Integration of at least some of the network topology information with higher network layers also is disclosed.

20 Claims, 11 Drawing Sheets

GENERATION AND MANAGEMENT OF NETWORK CONNECTIVITY INFORMATION

CROSS REFERENCE TO RELATED APPLICATION

This application is a Continuation of U.S. Non-Provisional application Ser. No. 13/736,172 filed Jan. 8, 2013, herein incorporated by reference in its entirety.

BACKGROUND

Conventional approaches to generation of network topology information, e.g., location information, connectivity information, or a combination thereof, in a network of functional elements rely extensively on human intervention and, as a result, are error prone and generally static. Such approaches fail to provide current network topology information in a cost effective manner. In addition, such approaches generally fail to be integrated across various layers of a network of functional elements.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates to, in one aspect, generation of network topology information for a network of assets, and management of such information. The management can comprise analysis and/or diagnostics of topology condition of a plurality of assets. In addition or in the alternative, the management can comprise consolidation of at least a portion of the network topology information into a data layer of the network of assets or a network functionally coupled thereto. Integration of at least some of the network topology information with higher network layers also is contemplated.

Some embodiments of the disclosure provide various advantages when compared to conventional approaches for generation of network topology information and management thereof. For example, one embodiment of the disclosure provides access to connectivity information associated with all or most all tagged equipment at a user site (e.g., a residential user or customer site, or a commercial user or customer site). As a result, the disclosure can permit addressing operational issues expeditiously, resulting in a reduction of cost and time associated with network service, and increased quality of customer service and increased customer satisfaction. For another example, another aspect of the disclosure permits integration of network topology information with administrative network layers, thus permitting remote assessment of network performance, with the ensuing reduction of costs associated with, for example, visitations of field facilities (e.g., a hub, an aggregator site, a base station site, or the like) for assessment and maintenance. For yet another example, other embodiments of the disclosure can permit monitoring of asset connectivity (e.g., fiber optic connectivity) in nearly real-time, according to a predetermined schedule, or in response to specific events. For example, near real-time monitoring can be provided for events such as deployment changes in a network comprising tagged assets, or delivery of status messages to specific portions of the network.

Additional aspects or advantages of the subject disclosure are set forth in part in the description which follows, and in part will be obvious from the description, or may be learned by practice of the subject disclosure. The advantages of the subject disclosure can be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

DETAILED DESCRIPTION

Figure 1:
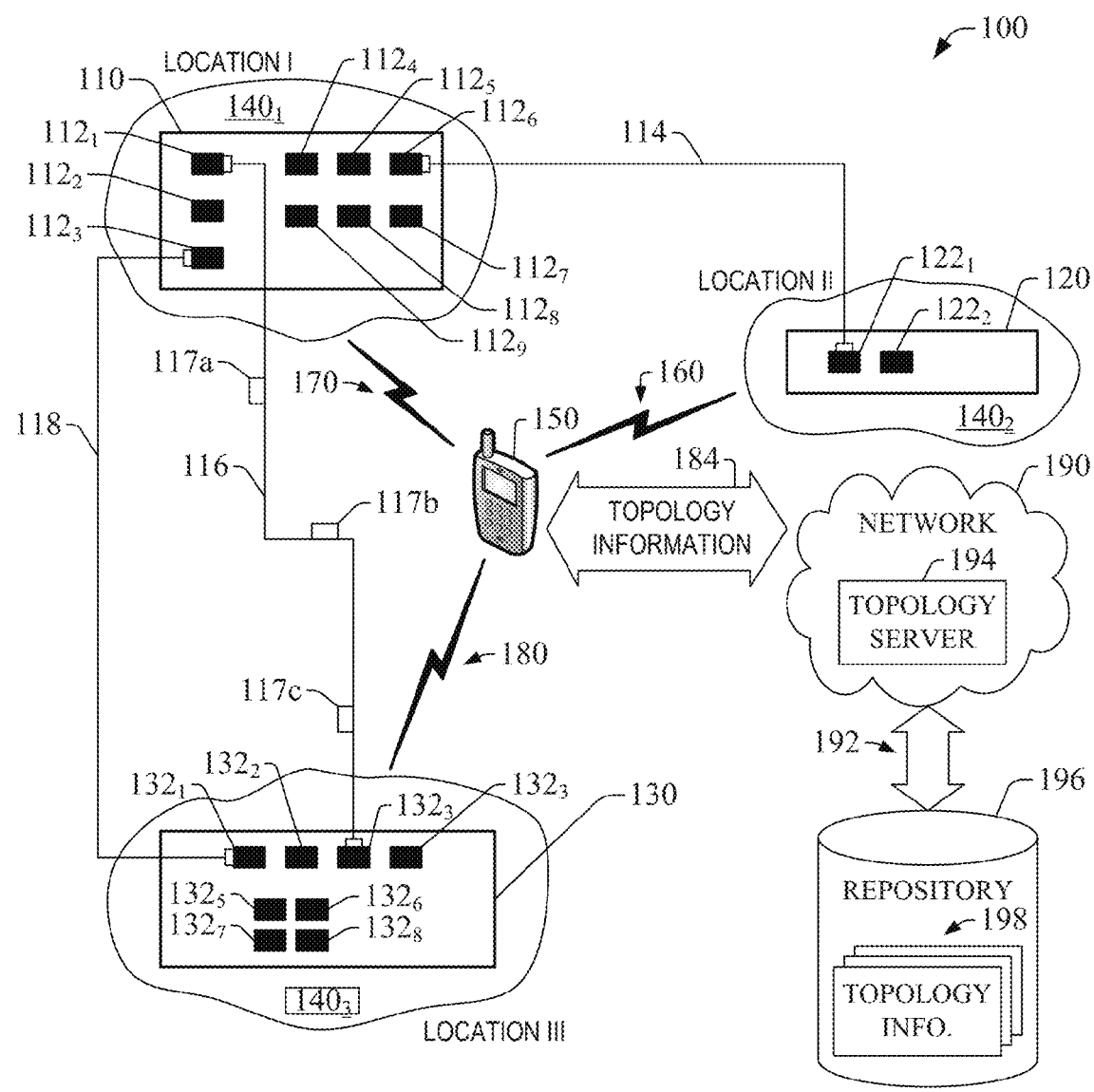
FIG. 1 illustrates an example system in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the disclosure is not limited to specific systems, articles, apparatuses, and methods for generation of network topology information for a network of assets, and management of such information. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "probe," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "layer," "unit," "component," "probe," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As it will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It also will be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the issue of inadequacy and failure-propensity of human intervention and ad-hoc approaches that are commonly utilized to generate network topology information. Such approaches generally rely on bookkeeping practices that are susceptible to "authorship collision" in that a first agent (e.g., a field engineer, a home owner, or the like) can generate network topology information for a specific network deployment according to a first documentation protocol, whereas a second agent can generate network information topology according to a second protocol, wherein such protocols can have different notations for records, can introduce specific bookkeeping errors, and/or can mutually modify the content of the network topology information. Thus, the network topology information generated by the first agent (or first author) can be incompatible (or can "collide") with the network topology information generated by the second agent (or second author). In addition or in the alternative, an ad-hoc approach can include reverse-engineering actions associated with inspection of connectivity between different network devices and, as a result, the approach be affected by "reconstruction blockade," which refers to the inability to implement the ad hoc approach for generation of network topology information in view that a network deployment may be rendered inoperable in response to implementation of the approach. For instance, an active connection in a network deployment (e.g., a plumbing connection, an electricity connection, a gas line, etc.) may not be disconnected in order to obtain connectivity information and reveal specific coupling amongst two or more network devices. Furthermore or as another alternative, ad hoc approaches can be affected by "directional myopia" in that reverse engineering the connectivity of a network device can be primarily local and can fail to reveal connectivity with a distant network device. As a result of the directional myopia, ad hoc approaches generally fail to reveal how a physical link (such as an optic fiber, a wire, or a pipe) is physically routed.

As described in greater detail below, the disclosure related, in one aspect, to generation of network topology information for a network of assets, and management of such information. As it will be apparent from the disclosure, the described generation of network topology information largely is immune to authorship collision, reconstruction blockade, and/or directional myopia. The management can comprise analysis and/or diagnostics of topology condition of a plurality of assets. In addition or in the alternative, the management can comprise consolidation of at least a portion of the network topology information into a data layer of the network of assets or a network functionally coupled thereto. Integration of at least some of the network topology information with higher network layers also is contemplated. Certain functional elements of the subject disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, utility network, etc.) that can include, for example, digital equipment, analog equipment, or both, wired or wireless equipment, etc.

FIG. 1 is a block diagram of an example system 100 that permits generation and/or management of network topology information in accordance with one or more aspects of the disclosure. The example system 100 can comprise a plurality of network devices positioned at specific locations. As illustrated, three network devices 110-130 can be positioned at respective locations $140_1$ (location I), $140_2$ (location II), and $140_3$ (location III). In certain embodiments, location I, location II, and location III can be part of a common area, such as a dwelling, a transportation vehicle, or an enterprise facility, the common area can be open (e.g., a park, a parking lot) or semi-open (a city recreation center, an event space, or a cable headend, for example). Examples of the dwelling can comprise a skyscraper, an apartment building, and the like. Examples of the transportation vehicle can comprise an aircraft carrier, an airplane, a cruise ship, an oil tanker, and the like. Examples of the enterprise facility can comprise a factory, or an oil refinery, a nuclear power plant, a central office of a telephone company, a hospital, and the like. In other embodiments, one of the locations 1401-140₃ can be geographically distant from the other two locations. For example, in a scenario in which the network devices are contained within a service network (such as a content delivery network), locations $140_1$ and $140_2$ can be within customer premises, whereas location $140_3$ can be situated at a last-mile aggregator. For another example, location $140_1$ can be the location of a mains circuit panel, whereas locations $140_2$ and location 140 can be situated at different positions within a factory floor.

Each one of the network devices can comprise one or more connectors or ports, referred to collectively as members, e.g., structural features or functional elements that can permit coupling to other network devices(s). For example, network device 110 can include nine members $112_1$-$112_9$, network device 120 can include two members $122_1$ and $122_2$, and network device 130 can include eight members $132_1$-$132_8$. As illustrated, member $112_1$ is functionally coupled to member $132_3$ via a link 116, member $112_3$ is functionally coupled to $132_1$ via a link 118, and member 1126 is coupled to 1221 via a link 114. In aspect, a member in a network device that is not coupled to another member in another network device can be referred to as an "in-use member," whereas members (such as member $122_2$ or member $112_9$) that are not coupled to other members can be referred to as "non-used" members.

Figure 2:
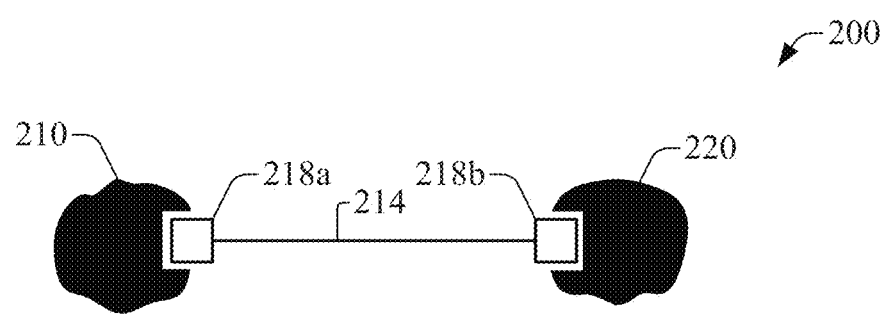
FIG. 2 depicts an example link connecting network devices in accordance with one or more aspects of the disclosure.

Each of the links 114, 116, and 118 can have a wireless tag unit (also referred to as wireless tag) fitted at each end of a physical link (comprising certain physical medium) that forms the link. In one aspect, each of the wireless tags can contain location information associated with the respective network device that the wireless tags are coupled to. The location information (e.g., a position vector (x,y,z)) can permit identifying the relative positioning of the ends of the physical link (e.g., a wire, an optic fiber, a pipe, etc.). Such wireless tags are represented as white boxes in FIG. 1, and example embodiment 200 in FIG. 2 illustrates tagging of end-points of a link. In such embodiment, a first wireless tag 218a can be attached to a physical link 214 (e.g., a wire, a pipe, an optic fiber, or the like) and coupled to a first member 210, and a second wireless tag 218b also is attached to the physical link 214 and coupled to a second member 220. In one embodiment, the wireless tag 218a can be or can comprise a male-plug proximity radiofrequency identification (RFID) tag coupled (e.g., connected) to a female-connector proximity RFID tag included in the member 210. Similarly, in such embodiment, the wireless tag 218b also can be a male-plug proximity RFID tag that can be coupled to a female-connector proximity RFID tag included in the member 220. Such proximity RFID tags can be passive tag units or battery-assisted tag units.

In addition or in the alternative, a link, such as link 116, can have one or more wireless tags, e.g., wireless tags 117a-117c, attached at respective positions along the link. The one or more wireless tags can contain location information (e.g., a "fix" for each wireless tag) that can permit generating routing information associated with the path between a first end of a physical link and a second end of the physical link. For example, location I and location II can be situated in different environments, such as different rooms or floors of a facility, and the path associated with the link 116 can proceed into a ceiling, along with many other wires, fibers, cables, through walls, and/or underground.

In one aspect, deployment of a plurality of wireless tags, such as wireless tags 117a-117c, in a link connecting a first network device and a second network device can address the issue of directional myopia, particularly, yet not exclusively, in complex sites, by providing (e.g., communicating to the wireless probe 150) information associated with a path between such network devices. Each of the plurality of wireless tags can reference at least one member of the first network device and at least one member of the second network device. In a scenario in which a connection proceeds through walls and rooms and different floors or risers, at least a portion of the plurality of wireless tags can transmit location information to the wireless probe 150, which can process such information and can generate data objects indicative of directions to span the path from the first network device to the second network device. The wireless probe 150 can supply such data objects to the repository 196. For instance, such directions can convey that the path can be spanned by turning left through this hall, right down the corridor, to this elevator, to this floor to this corridor, to this room, and so forth.

As the wire was initially run, it could also be scanned into the database. When it got to the far end, that device or connection would also have RFID on its female port. When it's plugged in and scanned, it would also enter into the database as a connection that has been made. The (x, y, z) coordinates of the 2 end-points and/or the information associated with the path between the two ends can be available. Accordingly, with the two end-point (x, y, z) coordinates, the straight distance and direction between the two end-points can be available.

It should be appreciated that, in one aspect, such directional information can provide rich details of the connectivity between network devices in networks of functional elements. Detailed information associated with such connectivity can permit faster response time to a network malfunction or maintenance event despite prior experience of personnel (e.g., a network employee, a vendor, or the like) servicing the location associated with the event.

In certain scenarios, network devices and/or links can be legacy network devices or legacy links that can be retrofitted with wireless tags. In such scenarios, a wireless tag can be added (or incorporated) to a legacy network device or a legacy link. It should be appreciated that in such scenarios connectivity may not be straightforward due to infrastructural elements (such as an item embedded into a wall, fire-stopper materials, and the like). In other scenarios, wireless tags can be incorporated in a bottom-up manner, with one or more wireless tags being incorporated to each network device and/or link that is added into a network deployment (or related network topology).

Network devices and links are collectively referred to herein as "assets." The assets can be specific to the network deployment comprising the wireless tags. In one aspect, a link can be embodied in or can comprise a specific physical medium that can permit functional coupling and/or structural coupling between two assets. For example, a network deployment can be a plumbing network in which the links can be embodied in or can comprise pipes of one or more types (PVC pipe, metal pipe, etc.), and the network device can include fittings, valves, flow meters, pressure meters, and/or water heating equipment.

As illustrated in FIG. 1, a wireless probe 150 can communicate wirelessly with a wireless tag coupled to a member, e.g., a port, in a network device, such as a router, a television set, or personal computer. In addition or in the alternative, the wireless probe 150 can communicate with a wireless tag attached to a link (e.g., link 114) that couples two members of disparate network devices. In one aspect, the wireless probe 150 can communicate wirelessly via wireless link(s) (e.g., link 160, link 170, and/or link 180) in accordance with a point-to-point radio technology protocol, even though other radio technology protocols can be utilized for communication. In another aspect, communication between a wireless tag and the wireless probe 150 or a component thereof can be effected in accordance with one or more packet-switched protocols, such as Ethernet protocol format; internet protocol (IP) format, such as IPv4 and IPv6, or the like; TCP/IP; user datagram protocol (UDP) format, HTTP, simple object access protocol (SOAP), simple network management protocol (SNMP), or the like.

As described herein, the wireless probe 150 can communicate with the wireless tags (represented with small, open rectangles) in network device 110 via wireless links 170, which comprises an upstream link (or uplink (UL) and a downstream link (or downlink (DL)). In addition, the wireless probe 150 can communicate with the wireless tag in network device 120 and the wireless tags in network device 130 via wireless links 160 and 180, respectively. In certain embodiments, the wireless links 160, 170, and 180 can transport information coded and multiplexed according to a common radio technology protocol. In such embodiments, differences among such wireless links can originate from transmission conditions of the air interface, such as signal-to-noise ratio, presence or absence of scattering, or the like. In addition or in the alternative, in embodiments in which the wireless probe 150 can operate in multiple modes (e.g., operate in accordance with various radio technology protocols), two or more of the wireless links 160, 170, or 180 can be different due to difference(s) in the radio technology protocol utilized to exchange information with a wireless tag in network devices 110, 120, or 130. Moreover or as another alternative, a wireless link that permits communication between the wireless probe 150 and a wireless tag in a network device can be specific to such wireless device. Thus, in one aspect, the wireless probe 150 can communicate via first wireless links with a first wireless device ($132_1$) and via second wireless links with a second wireless device ($132_3$) in the network device. It should be appreciated that communication via different wireless links can permit communication with different types of wireless tags, including present-generation wireless tags and prior-generation (or legacy) wireless tags, for example.

As part of communication with a wireless tag coupled to a network device, in one aspect, the wireless probe 150 can access information retained in the wireless tag. In one scenario, the wireless probe 150 can transmit electromagnetic (EM) radiation (e.g., EM radiation modulated and encoded into one or more packets of information) to the wireless tag, which can include circuitry that can energize the wireless tag in response to receiving the EM radiation. Upon or after being energized, the wireless tag can transmit information contained therein, the information can include, for example, location information (e.g., data and/or metadata indicative of position) and/or connectivity information associated with at least the wireless tag. The information that is transmitted can be collected by the wireless probe 150.

In a new build scenario, a local origin point—a (0,0,0) point (x,y,z) coordinate reference can be selected and tagged with a wireless device for a site. This would be logically tied to the actual GPS location in a database (e.g., location information 356). The wireless probe 150 can probe the location of that local origin point and compare and reference to such origin all subsequent local connections to be determined. In one aspect, the first network device (e.g., a device) can be placed at that site. As described herein, the network device, which can be a subtending origin point, and can be usually female connection points, can have wireless tags (e.g., passive RFID tags) coupled thereto. The wireless probe 150 can then scan the wireless tags (e.g., passive RFID tags) of the device and the ports, causing such wireless tags to supply (e.g., broadcast) identification and/or location information. As described herein, the wireless probe 150 can transmit such information, comprising their (x, y, z) coordinates into the database.

In one aspect, for a network device having one or more members that is incorporated into a network of functional elements (e.g., the set of network devices 110, 120, and 130), a first wireless scan of the network device can indicate that the network device has at least one (e.g., one, two, more than two, or all) of the one or more members is unconnected. As part of incorporation into such network, a first connection can be made. In one aspect, a male end of a connector, such as link, that is connected to a member of the network device can have a wireless tag that can detect, via proximity detection, an associated female wireless tag. In response to a wireless probe (e.g., 150) scanning the network device (e.g., a device with several ports), the wireless tag associated to the male end and the wireless tag associated with the female end can communicate network topology information, which the wireless probe can supply to network repository (e.g., repository 196). The network topology information can comprise connectivity information that indicates that male end and the female are paired—e.g., a good physical connection exists between such elements. In one aspect, the far end of the connector (e.g., wire, pipe, fiber etc.) also can have another paired male-female coupling. In a scenario in which the transmitted power for EM radiation emitted by the wireless probe is sufficiently elevated and/or the far end connector is within range of the emitted EM radiation, wireless device associated with male and female ends can supply network topology information to the wireless probe. In one aspect, the wireless probe can supply network information associated with the far end of the connector to the network repository. Such network information can comprise data and/or metadata indicative of the connector having two logically tied ends. One of such ends (e.g., the far end) can be classified in the network repository as plugged in, or active, whereas the other end, e.g., the end at the network device, can be classified as unplugged, or inactive at the time of the scan. It should be appreciated that after connection, in response to a scan by the wireless probe, both end of the connector can be classified as plugged-in.

In certain embodiments, a wireless tag (e.g., 218) can be sufficiently complex—e.g., it can include a dedicated power source and a processor—to broadcast information contained in the wireless tag. The information can be broadcast at specific intervals (e.g., at periodic intervals, at scheduled instants, or in response to an event). As described herein, such information can comprise location information and/or connectivity information associated with the wireless tag. In such embodiments, the wireless probe 150 can collect (e.g., receive and process) the broadcast information instead of actively probing the wireless tag. Thus, the wireless probe 150 operates as a monitoring device.

It should be appreciated that in certain scenarios, deployment of a wireless tag that can broadcast information contained therein can permit to communicate location information and/or connectivity information of the wireless tag from a position that may not permit the wireless probe 150 to probe such tag and, in response collect the location and/or connectivity information. For instance, a network device (e.g., the backplane of a quadrature amplitude modulation (QAM) node, a utility meter, or an industrial controller) can be positioned in a manner that other network devices (e.g., equipment) can block line-of-sight (LOS) transmission of EM radiation that can probe a wireless tag coupled to a member (e.g., a connector in the backplane or in the utility meter). Thus, if sufficient scattering of the EM radiation prevents the wireless probe 150 from probing such wireless tag, then location information and/or connectivity information associated with the network device can be unavailable. Yet, broadcast information from such wireless tag (e.g., wireless tag $132_1$) can be collected by the wireless probe 150, with the ensuing availability of location information and/or connectivity information.

In certain embodiments, a wireless tag can have sufficient complexity to perform proximity detection in response to the wireless tag being energized by the wireless probe 150. For example, the wireless tag can comprise a processor or other specific circuitry that can enable proximity detection. It should be appreciated that, in certain scenarios, proximity detection can be implemented at least during the period that two or more wireless tags (e.g., wireless tag 218 and mated counterpart) are energized by the wireless probe 150. The proximity detection can permit identifying the presence of other wireless tag(s) in the vicinity of the wireless tag. Such vicinity can be determined by a detection range based at least on the sensitivity of the wireless tag to RF signal transmitted by the other wireless tag(s). In one implementation, the detection range can be short-ranged in order to increase the likelihood that a proximal wireless tag that is detected is a mated wireless tag. In one aspect, the proximity detection includes collection of RF signal at the wireless tag, and determination of strength of the collected signal. For a strength that is at least substantially equal to a predetermined threshold, the wireless tag can establish that a proximal wireless tag is detected. In addition, as part of the proximity detection, the wireless tag can decode one or more of an identifier indicative of an identity of a detected proximal wireless tag or an identifier indicative of a logical address (e.g., an IP address, such as IPv6 address) of the wireless tag, wherein such identifiers are transported (or communicated) in the RF signal received from the proximal device. In response to detection of a proximal wireless tag, in one aspect, the wireless tag that performs the detection can transmit, to the wireless probe 150, information indicative of the wireless being a mated tag. In another aspect, the wireless tag that performs the detection can transmit (e.g., broadcast) one or more of an identifier indicative of the identity of such tag or an identifier indicative of a logical address thereof.

In certain scenarios, such as fiber optics splice cases, or welds or soldering, where wiring, metal, or fibers may need to be stripped back from a proximity point while a connection is rejoined, welded, or glued, the tags may need to be able to have 2 points to which they are attached, so that they can slide backward from the stripping or connection point, then forward to again to re-mate together upon the new connection to re-establish a new proximity detection point for rescanning.

As described herein, the wireless probe 150 can receive location information and/or connectivity information from one or more wireless tags coupled to one or more network devices and, based at least on such information, the wireless probe 150 can supply (e.g., transmit, process and transmit, or the like) topology information 184 of a network of network devices comprising network devices 110-130 to a topology server 194. As illustrated, the topology server 194, can be part of a network 190 (e.g., a service network, such as a cable television network, a data service network, a utility service network, combinations thereof, or the like). In one aspect, the topology information 184 can comprise one or more data objects indicative of the location information and/or connectivity information. The one or more data objects can comprise, in one implementation, information indicative of one or more network device IDs, network devices type, and/or network device location. In other implementations, the one or more data objects also can comprise information indicative of at least one logical address associated with at least one wireless tag.

Figure 3:
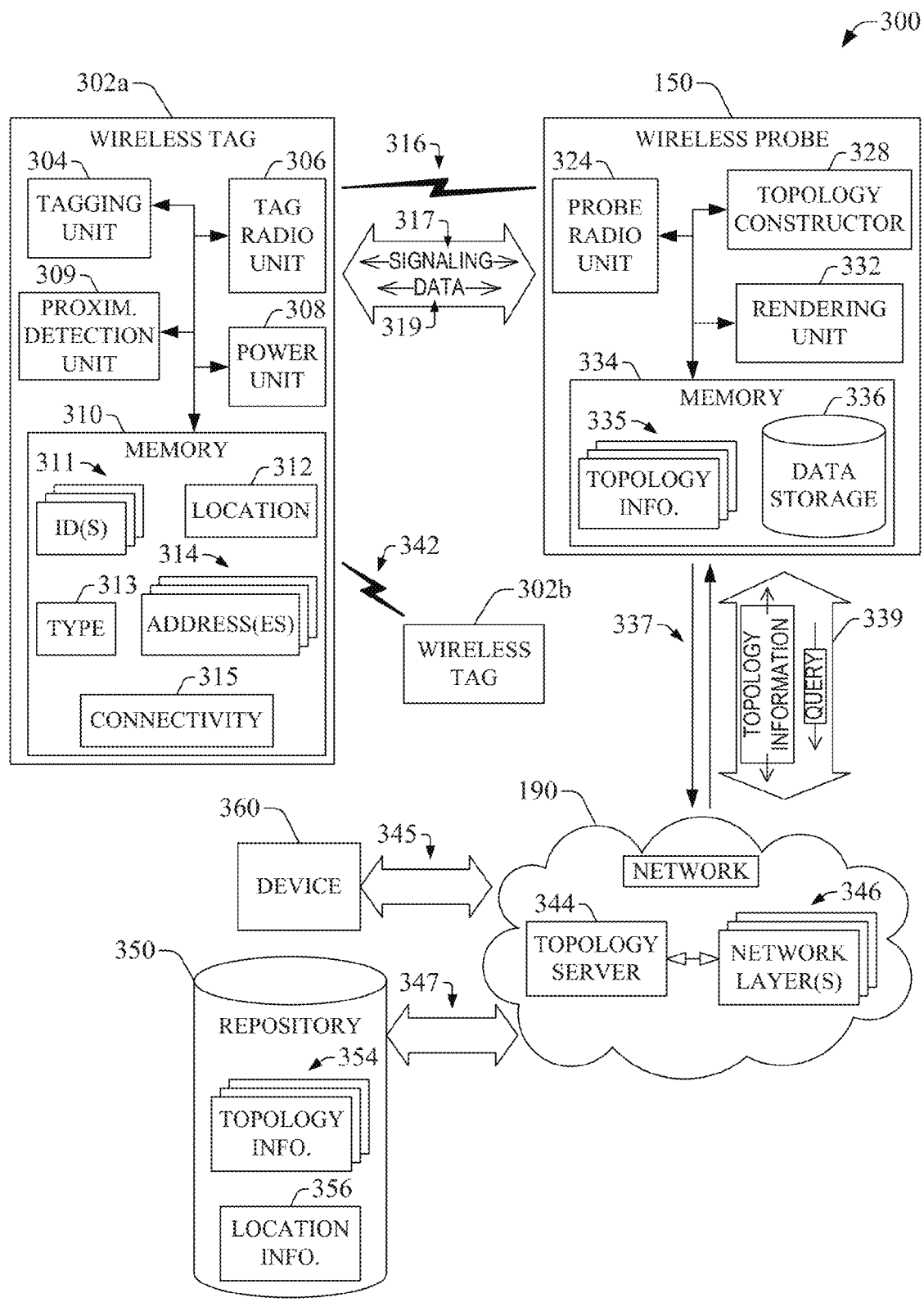
FIG. 3 illustrates an example system in accordance with one or more aspects of the disclosure.

To describe in greater detail the exchange of topology information among a wireless tag and the wireless probe 150, FIG. 3 illustrates a high-level block diagram of an example system 300 that enables generation and management of network topology information in accordance with one or more aspects of the disclosure.

As illustrated, the example system 300 comprises a wireless tag 302a that can be functionally coupled to the wireless probe 150 via wireless link(s) 315, which can permit the wireless tag 302a to exchange information with the wireless probe 150. In one aspect, the information can be transported via wireless link(s) 315 as part of signaling 317 and/or data 319. To exchange information with the wireless probe 150, in one aspect, the wireless tag 302a can comprise a tag radio unit 306 that can receive EM radiation. As described herein, in response to receiving the EM radiation, a power unit 308 can be energized, thereby supplying power to one or more of a tagging unit 304, a proximity (proxim.) detection unit 309, or the tag radio unit 306. In one aspect, upon or after being powered on, the tagging unit 304 can access information (e.g., data or metadata, or both) in memory 310, and can supply (e.g., transmit, process and transmit, or the like) at least a portion of such information to the tag radio unit 306. In another aspect, in response to receiving information, the tag radio unit 306 can provide, or supply, the information to the wireless probe 150. In one embodiment, the EM radiation can embody the signaling 317, and the tag radio unit 308 can comprise an antenna that can collect at least a portion of the signaling 317, and can inductively generate an electromotive force (EMF) that can energize the power unit 308. It should be appreciated that in additional or alternative embodiments, in order to energize the power unit 308, the wireless tag 302a can receive the EM radiation without receiving signaling 317 and/or data 319. In such embodiments, the wireless link(s) 315 can have an UL without a DL, wherein the UL can permit transmission of information from the wireless tag 302a to the wireless probe 150. Absence of a DL can simplify transmission of EM radiation from the wireless probe 150 to the wireless tag 302a because such radiation, in one aspect, need not be processed (e.g., modulated and/or encoded) for transmission as signaling 317 and/or data 319. In such alternative or additional embodiments, the tag radio unit 308 can comprise an antenna or a pick-up coil that can collect the EM radiation and energize the power unit 308.

As described herein, the proximity detection unit 309 can perform proximity detection in accordance with aspects described herein. In certain embodiments, the proximity detection unit 309 can be embodied in or can comprise one or more micro antennas (e.g., parabolic antenna(s)) and circuitry functionally coupled thereto that can permit detection of the strength of wireless signal received from a wireless tag, such as wireless tag 302b. Such wireless signal can be received via a wireless link 342. In addition or in the alternative, the proximity detection unit 309 can receive (e.g., decode) information indicative of, for example, an ID of the wireless tag (e.g., 302b) from which the wireless signal is received. In one embodiment, the proximity unit 309 can be integrated into the memory 310.

In one embodiment, the wireless tag 302a can be re-writable, having one or more pins (not depicted) for programming such tag and various information contained therein. In an additional or alternative embodiment, the wireless tag 302 also can have one or more pins (not depicted) for testing such tag (for example, probing the integrity of available information).

The information that the wireless tag 302a can transmit to the wireless probe 150 can be retained in the memory 310 and can comprise one or more of location information, identifying information, or connectivity information. In one aspect, the identification information can characterize the wireless tag 302a and/or the location thereof. As illustrated, the location information can be retained in a memory element 312 represented with a block labeled "location." The memory element 312 can be referred to as location 312 and can be embodied in or can comprise a register, a memory page, a file, a database, any combination thereof, or the like. The location 312 can comprise a data structure indicative of a location of wireless tag 302a, wherein the location can be conveyed with varying degrees of resolution depending at least in part on the network device (e.g., network device 120) to which the wireless tag 302a is coupled to. In one aspect, the resolution can increase with the density of network devices being tagged with wireless tags. In addition, in the illustrated example system 300, the identifying information can be retained (e.g., encoded) in several memory elements: (1) one or more memory elements 311 that can comprise one or more names or identifications (ID(s)) associated with the wireless tag 302a and/or an asset coupled thereto, such name(s) or ID(s) can be configured according to one or more specific naming conventions; (2) a memory element 313 that can comprise data and/or metadata indicative of a type of network device being tagged by the wireless tag 302a, and/or indicative of whether the wireless tag 302a is mated to another wireless tag (e.g., wireless tag 302b); (3) one or more memory elements 314 that can comprise data indicative of one or more logical addresses (e.g., IP address(es), such as IPv6 address, or the like); and (4) a memory element that can comprise connectivity information indicative of one or more assets to which the wireless tag is coupled to, e.g., the connectivity information can indicate a link to which the wireless tag 302a is attached to, a first member coupled to a first end of the link, and a second member coupled to a second end of the link. It should be appreciated that the naming convention can be established by one or more agents (human or machine), such as a manufacturer of the wireless tag 302a; a vendor of the wireless tag 302a; an administrator of a network comprising a network device tagged with the wireless tag 302a; or the like. It should also be appreciated that the connectivity information can include a logical variable indicative of attachment status, e.g., such variable can indicate if the wireless tag 302a is coupled to an in-use member or to a non-used member.

As described herein, the wireless probe 150 can receive information from a wireless tag, such as wireless tag 302a or wireless tag 302b. In one aspect, the wireless probe 150 can comprise a probe radio unit 324 that can transmit EM radiation to the wireless tag 302a to energize it and, in response, to receive information from the wireless tag 302a. In one aspect, the information can comprise at least a portion of the location information and/or the identifying information available in the wireless tag 302a. Such information can be received as part of data 319 via the UL included in the wireless link(s) 315. In one aspect, the radio probe unit 324 can supply at least a portion of the received information to a topology constructor 328 that can provide (e.g., generate or update) topology information, and can retain such information in one or more elements 335 represented with a block labeled "topology info." in memory 334. The memory element(s) 335 can be referred to as topology info. 335 and can be embodied in or can comprise a register, a memory page, a file, a database, any combination thereof, or the like.

In certain implementations, the topology information can comprise network location information and network connectivity information. In one aspect, the network topology information can include location information of the wireless tag 302a and/or identifying information thereof. In another aspect, the network connectivity information can include data indicative of a relationship between the location of wireless tag 302a and a location of another wireless tag (not shown in FIG. 2). For example, the network connectivity information can comprise data indicative of one or more wireless tags that are coupled to the wireless tag 302a, such as wireless tag 302b. In a scenario in which the wireless tag 302a embodies the wireless tag 218a, such data can be indicative of the wireless tag 218b. In one implementation, the data indicative of the one or more wireless tags that are coupled to the wireless tag 302a can be arranged in a hierarchical data structure comprising: a top tier having data indicative of the wireless tag 302a, which can be referred to as parent node in the hierarchy; a second tier having data indicative of wireless tag(s) that are directly coupled to the wireless tag 302a, such wireless tag(s) can be referred to as children node(s), one-hop wireless tag(s), or nearest-neighboring wireless tag(s); a third tier having data indicative of wireless tag(s) that are indirectly coupled to the wireless tag 302a and directly coupled to a wireless tag in the first tier, the wireless tag(s) in the second tier can be referred to as grand-children tag(s), two-hop wireless tag(s), or second-nearest-neighboring tag(s); and so forth. It should be appreciated that the hierarchical data structure can comprise a specific number of tiers dictated by the specific connectivity of a member associated with the wireless tag 302a to other member(s) in a network. In general, the hierarchical structure can comprise M tiers, with M being an integer number greater than or equal to zero. The scenario with M=0 represents an embodiment in which the wireless tag 302a is attached to a non-used member (e.g., $112_4$), whereas the scenario with M=1 represents an embodiment in which the wireless tag 302a is attached to a first in-use member (e.g., $112_6$) and coupled to a single second in-use member (e.g., $122_1$) in via link (e.g., link 114).

In one aspect, the topology constructor 328 can generate one or more hierarchical data structures containing the connectivity information of a member in a network device (e.g., 110) to other members within one or more disparate network devices (e.g., network devices 120 and 130). In one scenario, which can be referred to as local construction scenario, generation of the one or more hierarchical structures can be complete for a plurality of network devices based on information collected by probing a plurality of wireless units associated with the plurality of network devices. As an illustration, the local construction scenario can be realized for a plurality of customer premises equipment (CPE) forming a closed or substantially closed confined area network (CAN) within a confined operation area, such as a residential dwelling or a network hub, wherein each one of the CPE can be tagged with one or more wireless tags. In such scenario, the wireless probe 150 can collect (or otherwise receive) location information and connectivity information for each of the wireless tags coupled to the plurality of CPE. In view of the closed or substantially closed nature of the CAN, the connectivity information can be self-contained and thus sufficient to generate a set of one or more hierarchical data structures indicative of network topology of the CAN, such set is referred to as a complete set.

As illustrated, the wireless probe 150 can comprise a rendering unit 332 that can render at least a portion of the topology information 335 and/or at least a portion of data available in the data storage 336. In one aspect, the rendering unit 332 can render such information in response to a change in connectivity configuration of a network comprising the network device, and member therein, that is tagged by the wireless tag 302a. For instance, in one scenario, the topology server 344 can push connectivity updates that can update the topology information 335. The updated topology information can be rendered by the rendering unit 332 in nearly real-time or after the wireless tag 302a is probed.

In one aspect, the wireless probe 150 can transmit, via topology constructor 328, for example, the set of one or more hierarchical data structures to the topology server 344. Such set can transmitted via wireless links 337, as part of topology information.

In another scenario, which can be referred to as pseudo-local construction scenario, generation of the one or more hierarchical structures for a plurality of network devices can be accomplished based at least on information collected by probing a plurality of wireless units associated with the plurality of network devices and by collecting location information from a repository 350, which can be remote to the location of the wireless probe 150. In one implementation, the repository 350 can deployed in a cloud configuration in which the repository 350 is spatially distributed, having a plurality of data storage units (referred to as data storage sites; not shown) that form a data layer that is accessible from network elements that are local or remote to at least one (e.g., one, two, more than two, each) of the plurality of the data storage units.

As an illustration, the pseudo-local construction scenario can be realized for a plurality of equipment (e.g., QAM units) forming a semi-open CAN within a confined operation area, such as a network hub, wherein each one of the CPE can be tagged with one or more wireless tags. The semi-open character of the CAN can arise from substantial connectivity of at least one of the plurality of equipment with members external (e.g., remote) to the CAN. In such scenario, the wireless probe 150 can collect (or otherwise receive) location information and/or connectivity information for each of the wireless tags coupled to the plurality of equipment, and, in view of the semi-open characteristic of the CAN, the wireless probe 150 can query the repository 350.

Accordingly, as part of generation of such data structures, the network topology constructor 328 can query (or otherwise access) a repository 350 containing topology information 354. In response, the repository 350, via a data management component (not shown), can supply topology information in accordance with a query received from the wireless probe 150. Such information can be supplied, in one implementation, via a topology server 344, which can transmit the information to the wireless probe 150. As described herein, the topology server 344 can supply location information associated with members that are remotely located outside the probe range of the wireless probe 150. The rendering unit 332 can receive a connectivity update from the topology server. In response, the rendering unit 332 can render data indicative of updated topology information.

As described herein, the topology server 344 can receive, from the wireless probe 150, location information and/or connectivity information for a member in a network device at a specific location. Based on the location information and/or connectivity information that is received, the topology server 344 can process (e.g., aggregate, encode, decode, compress, decompress, encrypt, decrypt, certain combinations thereof, or the like) at least a portion of such information and generate network topology information. As part of the processing, in one aspect, the topology server 344 can manage several naming conventions of network devices, permitting utilization of different conventions in a manner that is seamless to the wireless probe 150 or other device that consumes location information and/or connectivity information in accordance with aspects described herein. In one aspect, the topology server 344 can map a current wireless naming convention to an extant, legacy naming convention that can be specific to a network layer of the network layer(s) 246.

In one embodiment, e.g., exemplary embodiment 400, the topology server 344 can comprise an aggregator unit 404 that can operate on at least the portion of the location information and/or the connectivity information. To at least such end, in one aspect, the aggregator unit 404 can operate on hierarchical data structures representative of the portion of the location information and/or the connectivity information. In one scenario, the aggregator unit 404 can augment a hierarchical data structure with other data structures (hierarchical or otherwise) to generate a larger data structure indicative of location information and/or connectivity information of larger portions of the network 340, or network devices therein. In another scenario, the aggregator unit 404 can extract a portion of a hierarchical data structure and, as a result, generate a smaller hierarchical data structure. The network topology information can comprise data and/or metadata associated with location and connectivity of a wide-area network comprising the network device coupled to the wireless probe 302. In one aspect, the network topology information can be retained in the repository 350 in one or more elements 354, represented with a block labeled "topology info." The memory element(s) 354 can be referred to as topology info 335 and can be embodied in or can comprise a register, a memory page, a file, a database, any combination thereof, or the like. It should be appreciated that the repository 350 can be included in a data storage layer included or can be functionally coupled to a core platform (not shown) of the network 340. For instance the repository 350 can be part of a content distribution network (CDN; not shown).

Figure 4:
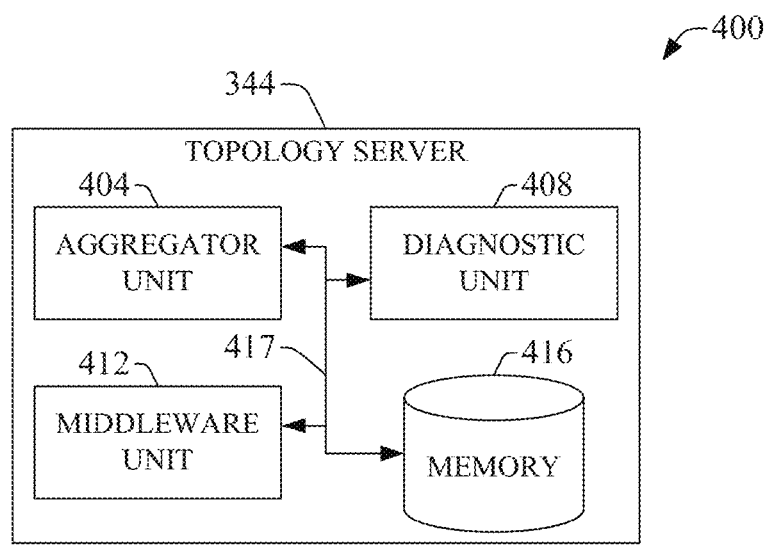
FIG. 4 illustrates an example computing device in accordance with one or more aspects of the disclosure.

In one scenario, the topology server 344 can monitor network integrity by comparing connectivity information (e.g., data and/or metadata) with idealized (e.g., planned) network connectivity. In addition or in the alternative, the topology server 344 can diagnose operational issues by signaling (e.g., delivering an instruction to) a first network device to transmit an information packet to a second network device designed to be communicatively coupled to the first network device. The information packet can be embodied in or can comprise a data packet and/or a control packet, and can be delivered via a first member contained in the first network device to a second member contained in the second network device. In one implementation, the information packet can be referred to as a pilot packet, and a member that receives the pilot packet can respond (e.g., generate and transmit a response pilot packet) in a specific manner based at least on the type of the pilot packet. In one aspect, failure of the first network device to deliver a pilot packet to the second network device, or failure of the second network device to transmit a response pilot packet to the first network device can indicate a root cause of an operational issue. For example, the root cause can comprise one or more of a non-operational link, a malfunctioning network device or member thereof, combinations of the foregoing, or the like. The topology server 344 can generate a record of the operational failure and can retain such record in the repository 350. In addition or in the alternative, in one embodiment (e.g., 400 in FIG. 4), the record of the operational failure can be retained in a memory 416 included in the topology server 344. In addition, or in the alternative, the topology server can supply the record to a wireless probe, such as wireless probe 150. The record, in one aspect, can be embodied or can comprise a data structure having data indicative of the first network device type and location, and second network device type and location. In one embodiment, e.g., embodiment 400 in FIG. 4, the topology server 344 can comprise a diagnostic unit 408 that can perform such monitoring and diagnostic as described herein.

The topology server 344 can distribute (e.g., transmit) the network topology information downstream, e.g., to the wireless probe 150 or other wireless probes, and/or upstream, e.g., to a network node in a network layer or another topology server. As illustrated, the network layer can be part of one or more network layers 346 (business layer, network planning layer, customer care layer, etc.). Such distribution can be performed, at least in part, via communication link(s) represented with open-head arrows, such link(s) can comprise one or more network components (router(s), server(s), network switches(s), connector(s), hubs, etc.) that can permit communication among the topology server 344 and a network layer of the one or more network layers 346. In certain embodiments, the communication link(s) can include one or more of: a reference link (Cx, Cr, Dh, Dx, Gm, Ma, Mg, or the like) and related components; conventional bus architectures such as address buses, system buses; wired links, such as high definition multimedia interface (HDMI) cables, fiber optic lines, coaxial lines, hybrid fiber-coaxial links, Ethernet lines, T-carrier lines, twisted-pair line, or the like, and various connectors (e.g., an Ethernet connector, an F connector, a USB connector, an RS-232 connector, or the like); wireless links, including one or more of terrestrial wireless links, satellite-based wireless links, or a combination thereof; and so forth.

In one embodiment, the topology server 344 can comprise a middleware unit 412 that can transmit network topology information to network node(s) in the one or more network layers 346, and/or network node(s) in an external network (e.g., external network 195). Upstream distribution of the network topology information can permit integration of such information into administration functions of the network 340. In certain embodiments, the topology server 344 can be located in a core platform (not shown) of the network 340. In other embodiments, the topology server 344 can be deployed in the field, remote to the core platform, at a specific location within the network 340. For example, the specific location can be the location of a hub in a content distribution network. For another example, the specific location can be the location of a last-mile aggregator in the content distribution network. In the latter examples, the topology server 344 can be embodied in a blade computer configured (e.g., programmed) to implement the functionality described herein. For yet another example, the specific location can be the location of a base station for macrocellular wireless communication.

As illustrated, the exemplary system 300 can comprise a device 360 that can manage network topology information retained in the data repository 350. In one embodiment, the device 360 can be a computing device in a network operation center (NOC). In another embodiment, the device 360 can be a computing device in an external network (e.g., a vendor's network) that can provide maintenance to a deployment of the network 340, or can perform network planning simulations. In yet another embodiment, the device 360 can be part of a customer care facility and, in one aspect, can query location information and connectivity information specific to a network customer (residential or commercial) in response to an operational issue experienced by the customer.

Figure 5:
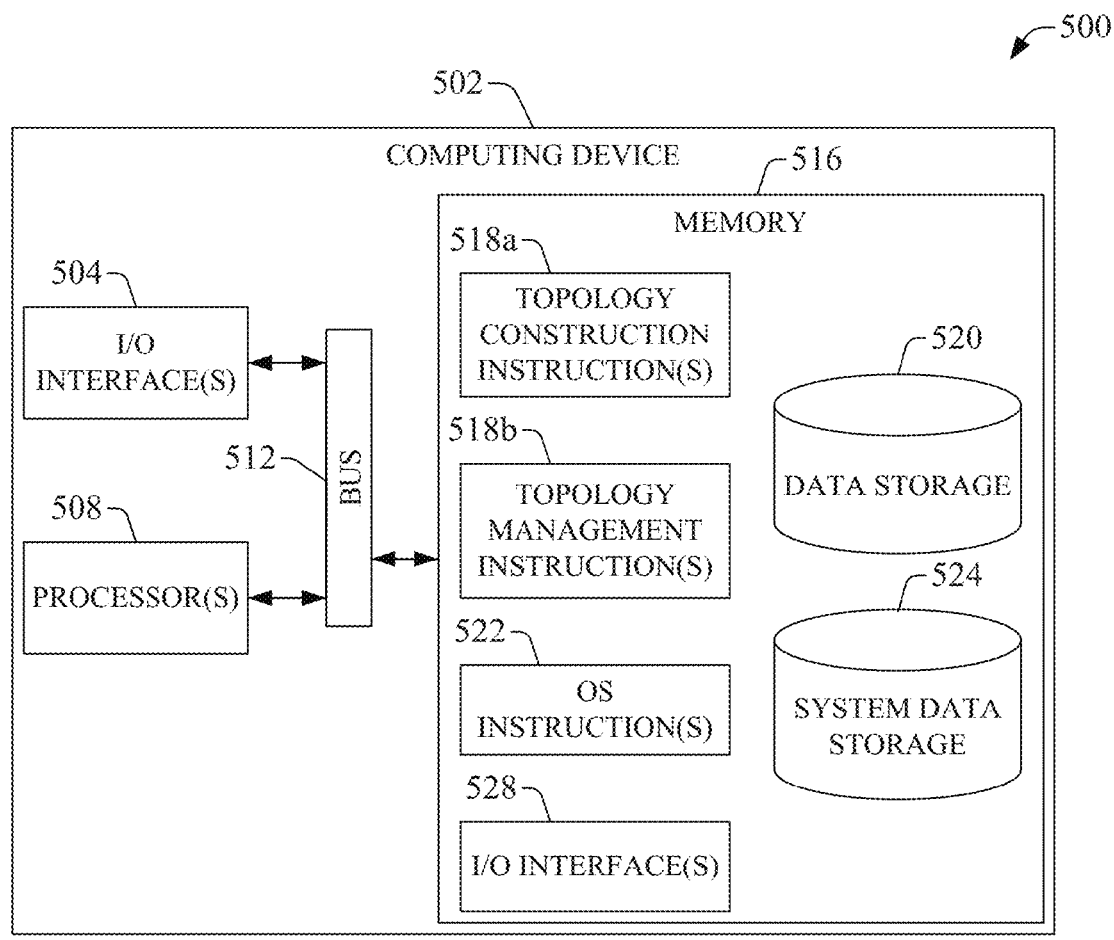
FIG. 5 illustrates an example computing device in accordance with one or more aspects of the disclosure.

FIG. 5 is a high-level block diagram of an exemplary embodiment 500 of a computing device 502 in accordance with one or more aspects of the disclosure. In certain implementations, the computing device 502 can embody the topology server 544. As illustrated, the computing device 502 comprises a group of one or more I/O interfaces 504, a group of one or more processors 508, a memory 516, and a bus 512 that functionally couples (e.g., communicatively couples) two or more of the functional elements of the topology server 544 including the group of one or more processors 508 to the memory 516. In certain scenarios, the group of one or more processors 508 can comprise a plurality of processors that can exploit concurrent computing.

Functionality of the computing device 502 can be configured by a group of computer-executable instructions (e.g., programming code instructions or programming modules) that can be executed by at least one processor of the one or more processors 508. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a group of computer-executable instructions can configure logic that, in response to execution by the at least one processor, can enable the computing device 502 to operate as the topology server 128 in accordance with aspects described herein.

Data and computer-accessible instructions, e.g., computer-readable instructions and computer-executable instructions, associated with specific functionality of the topology server 544 can be retained in memory 516. As illustrated, one or more memory elements, referred to as topology record(s) 519, can be retained in memory 516 in the data storage 520, and at least a portion of information contained in topology info. 354 and/or topology info 335 in example system 300 can be retained in the topology record(s) 519. It should be appreciated that, according to one or more aspects described herein, the data storage 520 can comprise a variety of data, metadata, or both, associated with network topology information associated with a network of functional elements. Such data and instructions can permit implementation, at least in part, of generation and/or management of network topology information in accordance with one or more aspects of the disclosure. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions (e.g., computer-readable and computer-executable instructions), and data can reside at various times in different storage elements (registers, memory pages, files, databases, memory addresses, etc.; not shown) in memory 516.

Memory 516 also can comprise one or more computer-executable instruction(s) for implementation of specific functionality of the topology server 344 in connection with the generation and/or management of network topology information described herein. Such computer-executable instructions can comprise topology construction instruction(s) 518a and/or topology management instruction(s) 518b. In one aspect, as described herein, the topology construction instruction(s) 518a and/or topology management instruction(s) 518b can be stored as an implementation (e.g., a compiled instance) of one or more computer-executable instructions that implement and thus provide at least the functionality of the methods described herein. The topology construction instruction(s) 518a and/or topology management instruction(s) 518b also can be transmitted across some form of computer readable media. It should be appreciated that different topology construction instruction(s) 518a and/or topology management instruction(s) 518b can render structurally alike computing devices into functionally different components, with functional differences dictated by logic (e.g., computer-executable instructions and data structures) specific to each one of such computing devices and defined by the topology construction instruction(s) 518a and/or topology management instruction(s) 518b.

Memory 516 can be embodied in a variety of computer-readable media. Exemplary computer-readable media can be any available media that is accessible by a processor in a computing device, such as one processor of the group of one or more processors 508, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 516 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 516 can be partitioned into a system memory (not shown) that can contain data and/or programming modules that enable essential operation and control of the topology server 344. Such program modules can be implemented (e.g., compiled and stored) in memory element 522, referred to as operating system (OS) instruction(s) 522, whereas such data can be system data that is retained in memory element 524, referred to as system data storage 524. The OS instruction(s) 522 and system data storage 524 can be immediately accessible to and/or are presently operated on by at least one processor of the group of one or more processors 508. The OS instruction(s) 522 can embody an operating system for the computing device. Specific implementation of such OS can depend in part on structural complexity of the computing device 502 (e.g., in certain embodiments, complexity of the topology server 344). Higher structural complexity can afford higher-level OSs. Example operating systems can include Unix, Linux, iOS, Microsoft Windows® operating system, and substantially any operating system for a computing device. In certain scenarios in which the computing device 502 embodies the topology server 344, the operating system embodied in OS instruction(s) 522 can have different levels of complexity based on particular configuration of the topology server 344.

Memory 516 can comprise other removable/non-removable, volatile/non-volatile computer-readable non-transitory storage media. As an example, memory 516 can include a mass storage unit (not shown) which can provide non-volatile storage of computer code, computer readable instructions, data structures, program modules, and other data for the computing device 502. A specific implementation of such mass storage unit (not shown) can depend on desired form factor of the computing device 502 and space available for deployment thereof. For suitable form factors and sizes of the computing device 502, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of generation and/or management of network topology information described herein can be performed, at least in part, in response to execution of software components by a processor. The software components can include one or more implementations of the topology construction instruction(s) 518a and/or topology management instruction(s) 518b—e.g., topology construction instruction(s) 518a and/or topology management instruction(s) 518b compiled with different compilers. In particular, yet not exclusively, to provide the specific functionality of the computing device 502, a processor of the one or more processors 508 can execute at least a portion of the computer-accessible instructions in topology construction instruction(s) 318a and/or topology management instruction(s) 518b. In certain embodiments, the memory 516 can have computer-executable instructions encoded thereon, such instructions embodying or comprising an implementation of the topology construction instruction(s) 518a and/or topology management instruction(s) 518b.

In general, a processor of the group of one or more processors 508 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 508 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 508 can be implemented as a combination of computing processing units.

The one or more input/output (I/O) interfaces 504 can functionally couple (e.g., communicatively couple) the topology server 344 to another functional element (component, unit, server, gateway node, repository, etc.), for example. Functionality of the topology server 344 that is associated with data I/O or signaling I/O can be accomplished in response to execution, by a processor of the group of one or more processors 508, of at least one L/O interface retained in memory element 528. Such memory element is represented by the block I/O interface(s) 528. In some embodiments, the at least one I/O interface embodies an API that permits exchange of data or signaling, or both, via an I/O interface of I/O interface(s) 504. In certain embodiments, the one or more I/O interfaces 504 can include at least one port that can permit connection of the topology server 344 to other functional elements of the example system 300. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 504 can enable delivery of output (e.g., output data, output signaling) to such functional elements. Such output can represent an outcome or a specific action of one or more actions described herein, such as the actions in one or more of the methods illustrated in FIG. 9 through FIG. 12.

In certain embodiments, the topology server 344 can comprise a functionality specific platform (not shown) which can include one or more components that enable the functionality of the computing device 502. In an embodiment in which the computing device 502 embodies the topology server 344, a component of the one or more components can be a firmware component having dedicated resources (e.g., a processor, software, etc.) to implement certain functions that support implementation of or implement at least part of the functionality of the topology server 344. In another embodiment, the functionality specific platform can include at least a portion of the one or more processors 508 which can be dedicated to execution of a part or all of the topology construction instruction(s) 318a and/or topology management instruction(s) 518b, thus relieving at least some of the computational load from the one or more processors 508 for other operation of the computing device 502.

Bus 512, and the various configurations thereof, represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

Figure 6A:
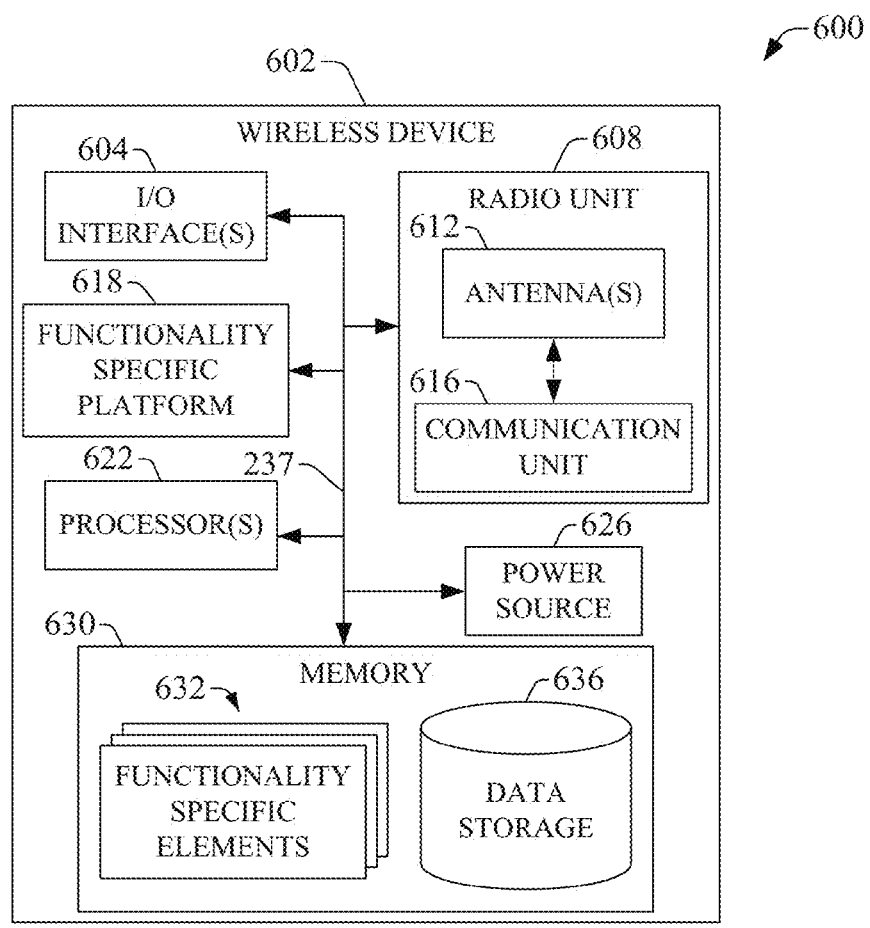
FIG. 6A illustrates an example wireless device and respective functional elements in accordance with one or more aspects of the disclosure.
Figure 6B:
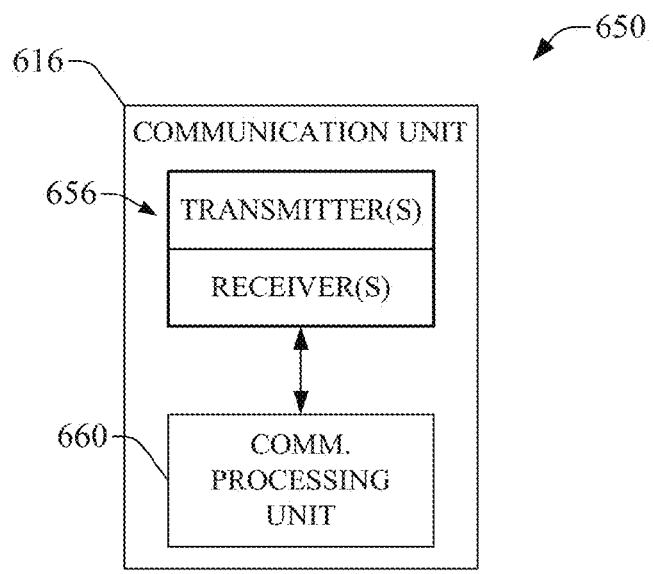
FIG. 6B illustrates an example wireless device and respective functional elements in accordance with one or more aspects of the disclosure.
Figure 7A:
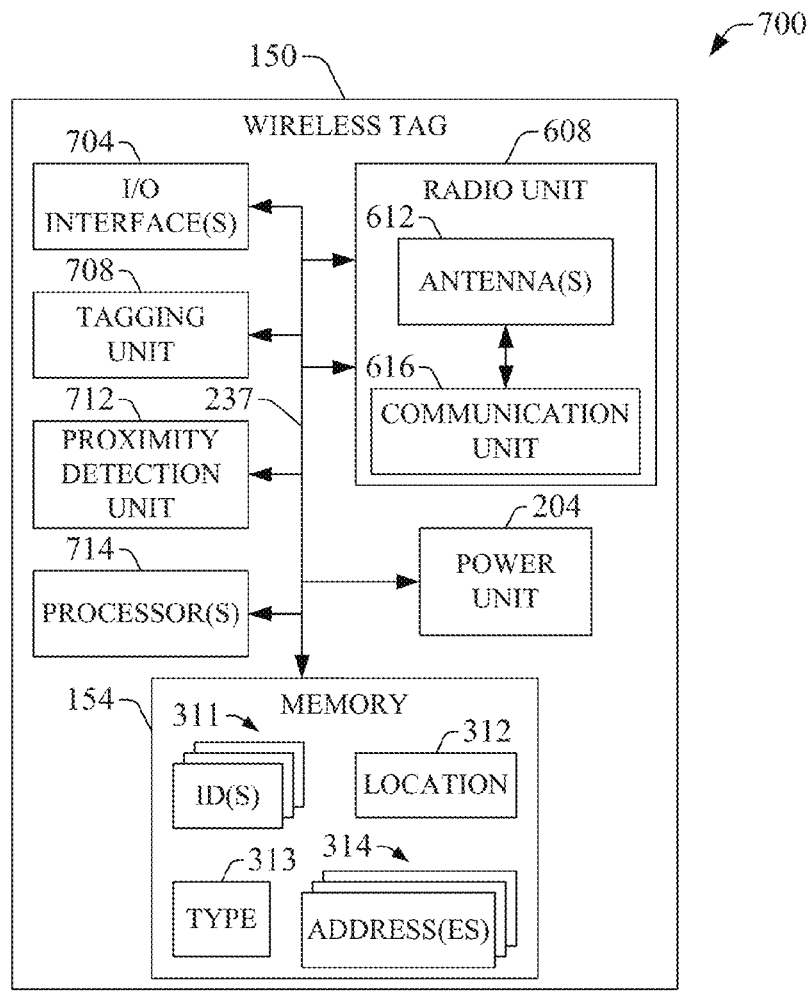
FIG. 7A illustrates an example wireless device and respective functional elements in accordance with one or more aspects of the disclosure.

FIG. 6A illustrates an example embodiment 600 of a wireless device 602 that can operate in accordance with at least certain aspects described herein. In one aspect, the wireless device 602 can embody a wireless probe, such as wireless probe 302. In another aspect, the wireless device 602 can embody a wireless probe, such as wireless probe 150. To permit wireless communication, the wireless device 602 includes a radio unit 608 having one or more antennas 612 and a communication unit 616. As illustrated in exemplary embodiment 650 shown in FIG. 6A, the communication unit 616 can comprise a set of one or more transmitters/receivers 656, and components therein (amplifiers, filters, etc.), functionally coupled to a communication (comm.) processing unit 660. In certain implementations, such processing unit can comprise a modulator/demodulator (mod/demod) unit (also referred to as modem), a multiplexer/demultiplexer (mux/demux) unit, and a coder/decoder unit (also referred to as codec). Each of the transmitter(s)/receiver(s) 756 can transmit and receive wireless signal via the one or more antennas 612. It should be appreciated that the architecture of the communication processing unit 660 can be specific to the functional complexity of the wireless device 602. For example, in a scenario in which the wireless device 602 embodies a wireless tag, such as example embodiment 700 illustrated in FIG. 7A, the complexity of the communication unit 616 can be lower than the complexity of such unit in a scenario in which the wireless device 602 embodies a wireless probe, such as wireless probe 150 as illustrated in example embodiment 800 in FIG. 8A. It should also be appreciated that complexity of the transmitter(s)/receiver(s) 656 can be specific to complexity of the wireless device 602. For instance, the transmitter(s)/receiver(s) 756 in embodiment 750, illustrated in FIG. 7B, can be less complex that the transmitter(s)/receiver(s) 856 in embodiment 850, illustrated in FIG. 8B.

Electronic components and associated circuitry of the communication processing unit 660 can permit processing and manipulation, e.g., coding/decoding, deciphering, modulation/demodulation, of signal(s) received by the wireless device 602 and signal(s) to be transmitted by the wireless device 602. In one aspect, received or transmitted wireless signal(s) can be modulated and coded, or otherwise processed, in accordance with one or more radio technology protocols (e.g., 3rd Generation Partnership Project (3GPP) Universal Mobile Telecommunication System (UMTS), 3GPP Long Term Evolution (LTE), or the like). The electronic components in the communication unit 616, including the one or more transmitters/receivers 656, can exchange information (e.g., data, code instructions, signaling and related payload data, or the like) through a bus (represented with a double-headed arrow), which can embody or comprise at least one of a system bus, an address bus, a data bus, a message-passing bus, a power bus, a reference link or interface, a combination thereof, and the like. Each of the one or more transmitters/receivers 656 can convert signal from analog to digital and vice versa. In addition or in the alternative, the transmitter(s)/receiver(s) 656 can divide a single data stream into multiple parallel data streams, or perform the reciprocal operation. Such operations may be conducted as part of various multiplexing schemes.

Figure 7B:
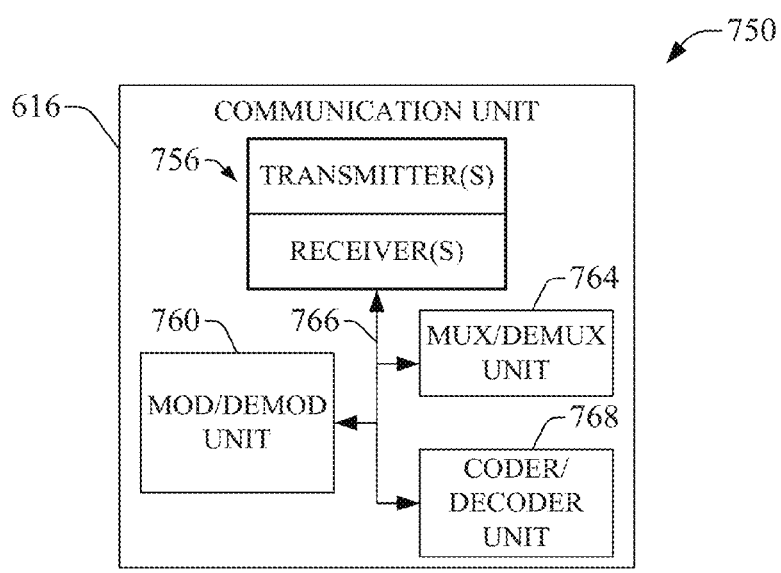
FIG. 7B illustrates an example wireless device and respective functional elements in accordance with one or more aspects of the disclosure.
Figure 8A:
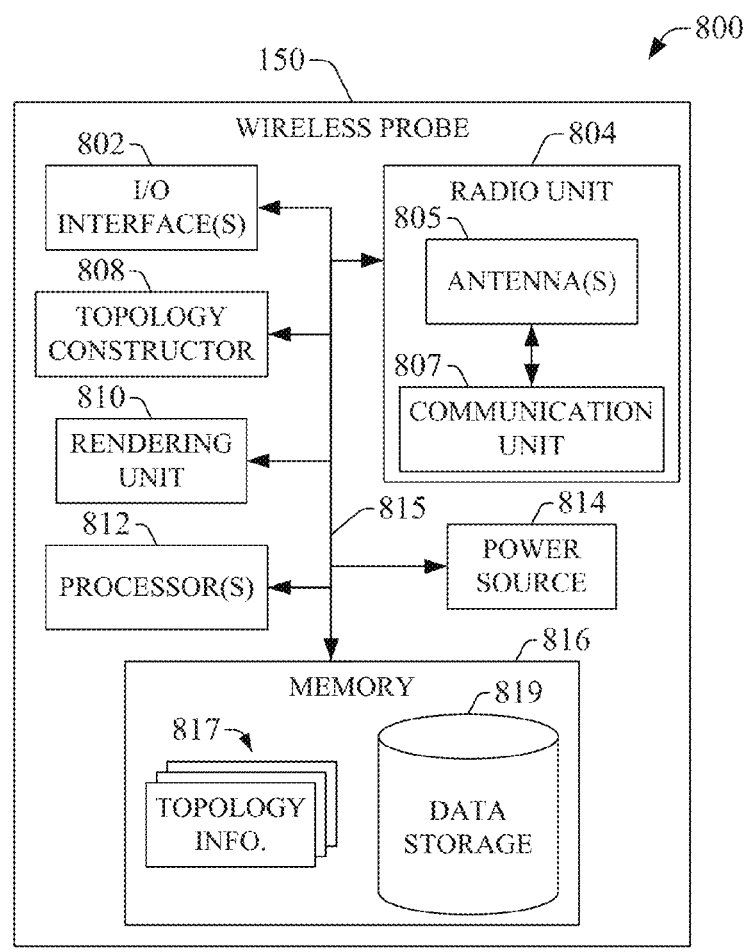
FIG. 8A illustrates an example wireless device and respective functional elements in accordance with one or more aspects of the disclosure.
Figure 8B:
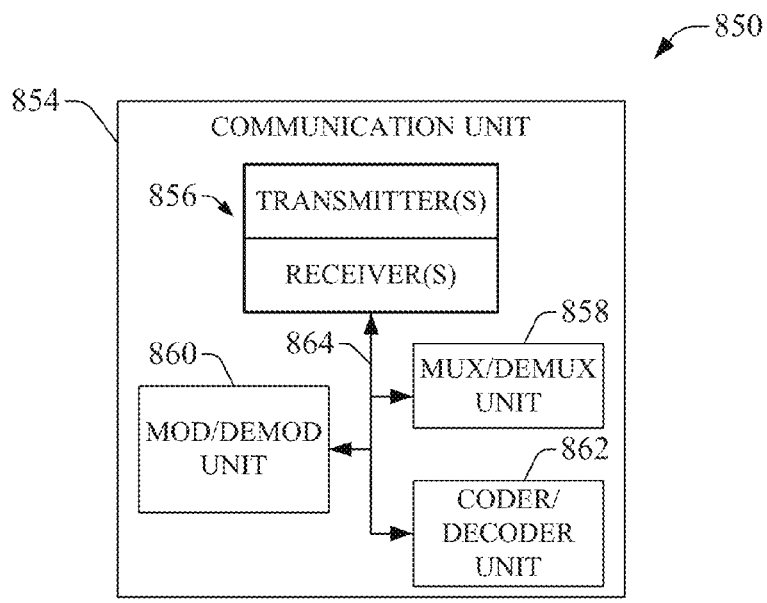
FIG. 8B illustrates an example wireless device and respective functional elements in accordance with one or more aspects of the disclosure.

In certain embodiments, as illustrated in FIG. 7B and FIG. 8B, the communication processing unit 660 can comprise a mux/demux unit (e.g., mux/demux unit 764 or mux/demux unit 864) that is functionally coupled to the one or more receivers/transmitters 656 and can permit processing of signal(s) in time and frequency domain. In one aspect, the mux/demux unit can multiplex and demultiplex information (e.g., data, signaling, or both) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux component 308 can scramble and spread information (e.g., codes) according to substantially any code; e.g., Hadamard-Walsh codes, Baker codes, Kasami codes, polyphase codes, and so on. As described herein, the communication processing unit 660 can comprise a modem (e.g., modem 760 or modem 860) that can modulate and demodulate information (e.g., data, signaling, or both) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) 622 can enable, at least in part, the wireless device 602 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The communication processing unit 660 can comprise a codec (e.g., codec 768 or codec 868) that can operate on information (e.g., data, signaling, or both) in accordance with one or more coding/decoding schemes suitable for communication, at least in part, through the one or more transmitters/receivers 656. In one aspect, the coding/decoding schemes, or related procedures, can be retained as a group of one or more computer-executable instructions in memory 630. In a scenario in which wireless communication among the wireless device 602 and a device (e.g., a wireless tag or a wireless probe) utilizes multiple-input multiple-output (MIMO), multiple-input single-output (MISO), single-input multiple-output (SIMO) or single-input single-output (SISO) operation, the codec can implement at least one of space-time block coding (STBC) and associated decoding; or space-frequency block (SFBC) coding and associated decoding. It should be appreciated that one or more such functionalities of the codec can be available in embodiments of certain complexity. For instance, in an example scenario in which the wireless device 602 embodies a wireless tag (e.g., wireless tag 218a) with low complexity, wireless communication according to MIMO, MISO, or SIMO, may not available.

In addition or in the alternative, the codec can extract information from data streams coded in accordance with spatial multiplexing scheme. In one aspect, to decode received information (data, signaling, or both), the codec 312 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec can employ, at least in part, a mux/demux unit and a mod/demod unit contained in the communication processing unit 660 in order to operate in accordance with aspects described herein.

The wireless device 602 can operate in a variety of wireless environments having wireless signals conveyed in different electromagnetic radiation (EM) frequency bands. To at least such end, the communication unit 616 can process (code, decode, format, etc.) wireless signal(s) within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, or (ii) all or most unlicensed frequency bands currently available for telecommunication.

In the illustrated embodiment, the wireless device 602 comprises a memory 630 and one or more processors 622 functionally coupled to the memory 630. In one aspect, the functional coupling is provided via a bus 637. The memory 630 can comprise one or more memory elements 632 comprising computer-executable instructions encoded thereon. Such memory elements are labeled "functionality specific elements" and, in response to execution by one of the one or more processors 622, can enable at least specific functionality of the wireless device 602. In addition or in the alternative, the memory 630 can comprise a data storage 636 that can contain information (e.g., data and/or metadata) associated with generation and/or management of network topology information according to aspects described herein. It should be appreciated that the data storage 636 can be specific to an implementation of the wireless device 602. In an implementation in which the wireless device 602 embodies a wireless tag, such as example embodiment 700 in FIG. 7A, the data storage 636 can comprise one or more IDs 311, location 312, type 313, and one or more address(es) 314, and connectivity 315. In certain implementations, at least a portion of the data storage 636 can be retained in a removable element, such as a subscriber identification module (SIM) card storage, a universal integrated circuit card (UICC) storage, or a removable user identity module (RUIM). In an implementation in which the wireless device 602 embodies the wireless probe 150, such as example embodiment 800 in FIG. 8A, the data storage 636 can comprise topology info. 335 and data storage 336.

In certain implementations, a processor of the one or more processors 622 can be configured, by the computer-executable instructions, to receive data wirelessly from a plurality of wireless tags. As described herein, the plurality of wireless tags can be embodied in a plurality of RFID devices, wherein at least one of the RFID devices of the plurality of RFID devices being coupled to a selected location in a network device of a communication network. The computer-executable instructions also can configure the processor to generate a network topology of the plurality of RFID devices based at least on a portion of the data, the data comprising location information associated with at least one of plurality of RFID devices. The network topology can comprise data indicative of each location of each one of the plurality of RFID devices. The network topology comprises a connectivity map having data indicative of one of presence or absence of a connection among at least two RFID devices of the plurality of RFID devices, wherein the connection is one of a physical connection or a logical connection.

In one aspect, the processor can be further configured to supply at least a portion of the network topology to a network element in the communication network. In addition or in the alternative, the processor can be configured to cause an electronic device to render the network topology. In another aspect, the processor can be configured to implement a naming convention for identifying each one of the plurality of RFID devices. In yet another aspect, the processor can be configured to update the network topology in response to addition or removal of an RFID device from the plurality of RFID devices. In still another aspect, the processor can be configured to cause a device (e.g., wireless device 602) to refresh a rendering of an extant network topology in response to an update to the extant network topology.

As illustrated, the wireless device 602 comprises one or more processors 622 which can permit, at least in part, functionality of one or more functional elements of the wireless device 602 in accordance with at least certain aspects described herein. The one or more processors 622 can be functionally coupled to each functional element within the wireless device 602 and to the memory 630 via the bus 637. In certain implementations, the bus 637 can be embodied in one or more of: a memory bus, a system bus, an address bus, a message-passing bus, a power bus, or one or more reference links or interface(s). While in embodiment 600, the one or more processors 622 are illustrated as external to the functionality specific platform 618, in an additional or an alternative embodiment, at least one of the one or more processors 622 can be integrated into such platform. In one implementation in which the wireless device 602 embodies a wireless tag, e.g., such as example embodiment 700 in FIG. 7A, the functionality specific platform can comprise or can be embodied in a tagging unit 708 and a proximity detection unit 712, which can have the functionality of tagging unit 304 and proximity detection unit 309, respectively. It should be appreciated that, in some embodiment(s), one or more of the tagging unit 708 or the proximity detection unit 712 can reside within the memory 630 as one or more sets of computer-accessible instructions, e.g., computer-readable computer-executable instructions. Such instructions, in response to execution by a processor of the one or more processors 714, can implement the functionality of the tagging unit 708 and/or the proximity detection unit 712 in accordance with aspects of the disclosure. In another implementation in which the wireless device 602 embodies a wireless probe, e.g., such as example embodiment 700 in FIG. 8A, the functionality specific platform can comprise or can be embodied in a topology constructor 808 and a rendering unit 810, which can have the functionality of topology constructor 328 and rendering unit 332, respectively. The rendering unit 332 can be contained in the one or more I/O interface(s) 802. It should be appreciated that, in some embodiment(s), one or more of the topology constructor 808 or the rendering unit 810 can reside within the memory 630 as one or more sets of computer-accessible instructions, e.g., computer-readable computer-executable instructions. Such instructions, in response to execution by a processor of the one or more processors 714, can implement the functionality of the tagging unit 708 and/or the proximity detection unit 712 in accordance with aspects of the disclosure.

In view of the various aspects of generation of network topology information for a network of assets, and management of such information described herein, example methods that can be implemented in accordance with the disclosure can be better appreciated with reference to the flowcharts in FIG. 9 through FIG. 12. For simplicity of explanation, the example methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The method(s) disclosed throughout the subject specification and annexed drawings can be retained, or stored, on an article of manufacture, or computer-readable non-transitory storage medium, to facilitate transporting and transferring such methods to computing devices (e.g., desktop computers, mobile computers, wearable computers, mobile telephones, and the like) for execution, and thus implementation, by a processor or for storage in a memory.

Figure 9:
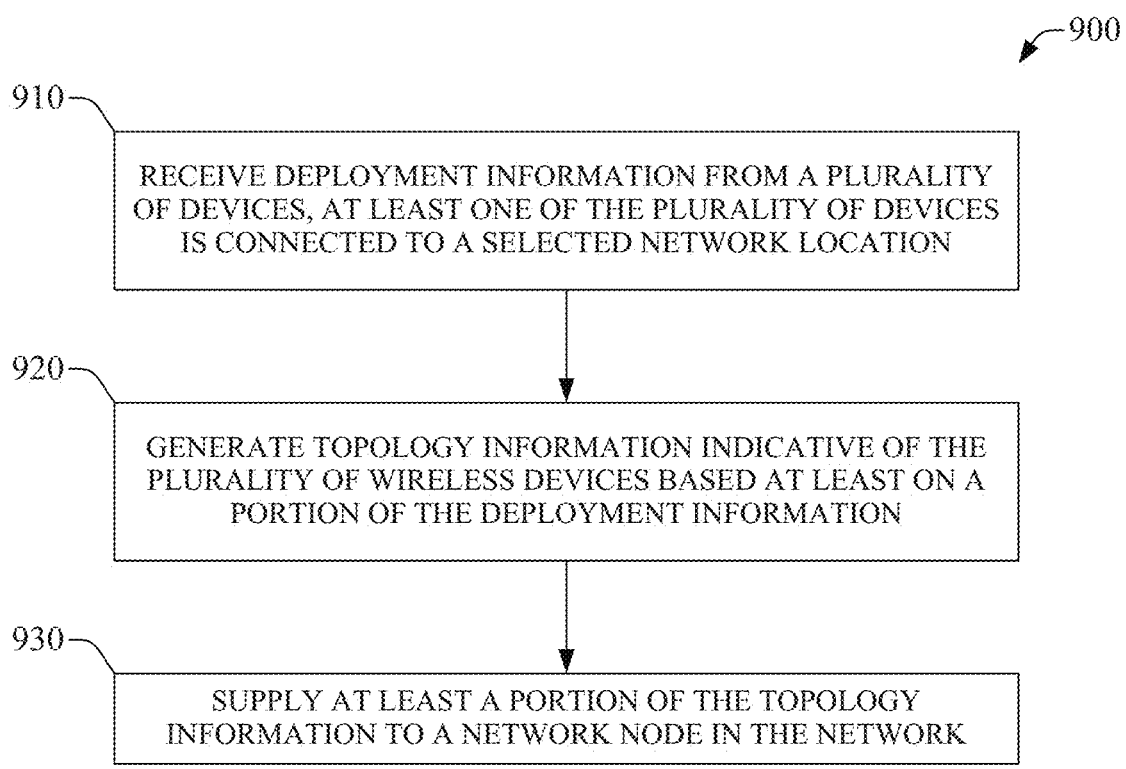
FIG. 9 is a flowchart illustrating an example method in accordance with one or more aspects of the disclosure.

FIG. 9 is a flowchart of an exemplary method 900 for providing network topology information in accordance with one or more aspects of the disclosure. One or more blocks of the exemplary method 900 can be implemented (e.g., performed or executed) by a computing device, such as the wireless probe 150, or a processor integrated therein or functionally coupled thereto. At block 910, deployment information is received from a plurality of devices, wherein at least one of the plurality of devices is connected to a selected network location. For example, the plurality of devices can be wireless devices that communicate through a wireless network. In one aspect, the deployment information can comprise data and/or metadata indicative of one or more of location information of the plurality of devices or connectivity information between at least two devices of the plurality of devices. At block 920, topology information indicative of the plurality of devices is generated based the deployment information. For example, the topology information can be generated based on some or all of the deployment information. At block 930, at least a portion of the topology information is supplied to a network node in the network. In one embodiment, such information can be supplied to a server deployed (e.g., installed and provisioned) in the network. For example, the server can be or can comprise the topology server 344.

Figure 10:
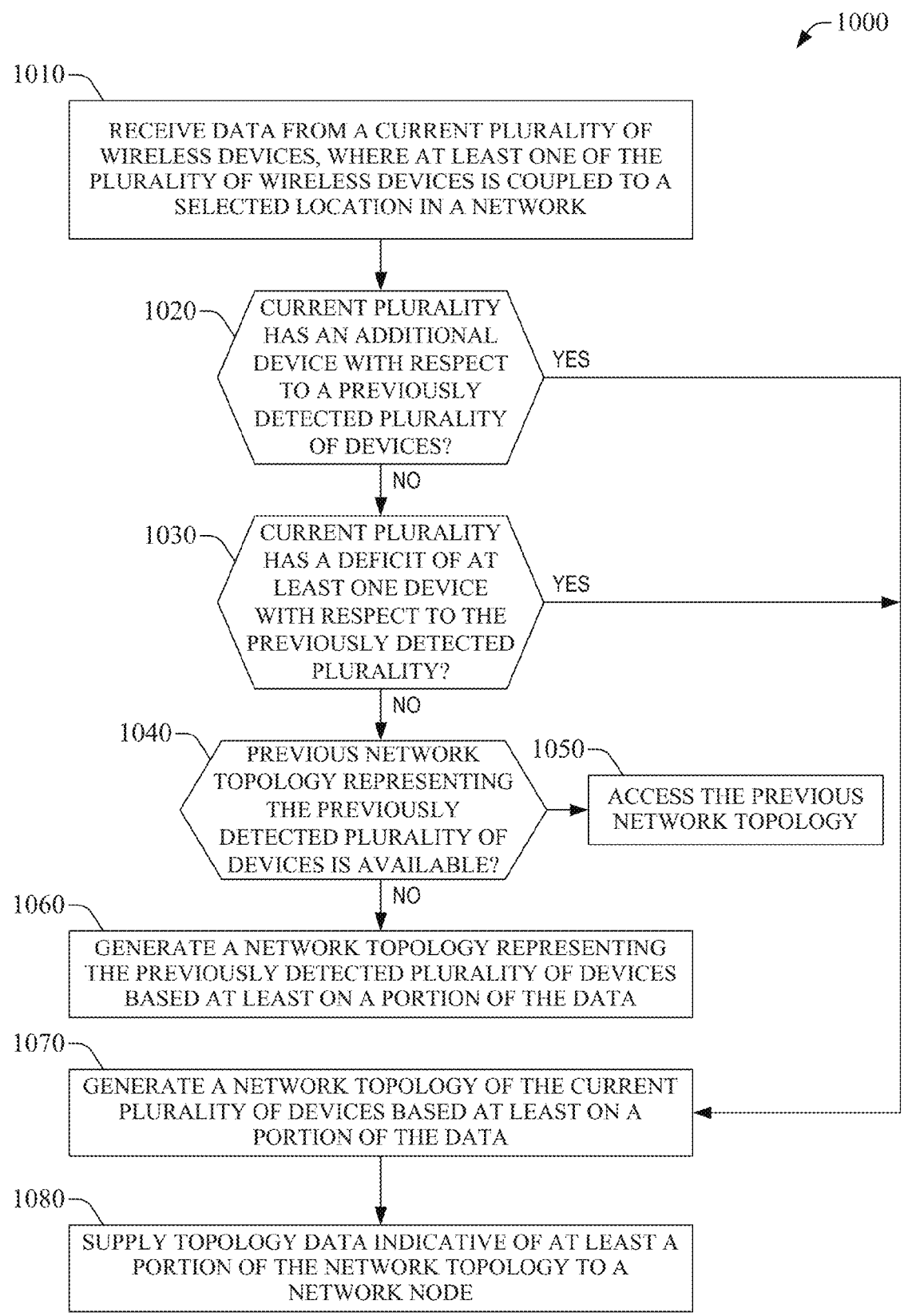
FIG. 10 is a flowchart illustrating an another example method in accordance with one or more aspects of the disclosure.

FIG. 10 is a flowchart of an exemplary method 1000 for updating network topology information in accordance with one or more aspects of the disclosure. In one aspect, the subject example method can be implemented (e.g., executed) in response to changes in deployment of a wireless tag functionally coupled to an asset in a network. For example, a wireless probe in accordance with one or more aspects described herein, such as the wireless probe 150, or a processor integrated therein or functionally coupled thereto can implement the subject example method 1000. At block 1010, data is received (e.g., wirelessly) from a current plurality of devices (e.g., wireless devices), wherein at least one of the plurality of devices is coupled to a selected location in a network. At block 1020, it is determined if the current plurality of devices has an additional device with respect to a previous plurality of devices. In the affirmative case, flow is directed to block 1070. In the alternative, in the negative case, it is determined at block 1030 if the current plurality has a deficit of at least one device with respect to a previously detected plurality of devices. In the affirmative outcome of block 1030, flow is directed to block 1070. In the negative outcome, flow is directed to block 1040, at which it is determined if a previous network topology representing the previously detected plurality of devices is available. In the affirmative case, at block 1050, the previous network topology is accessed. In the alternative, at block 1060, a network topology representing the previously detected plurality of devices is generated based at least on a portion of the data.

At block 1070, a network topology of the current plurality of devices is generated based at least on a portion of the data received at block 1010. At 1080, topology data indicative of at least a portion of the network topology is supplied to a network node (e.g., an application server in an application layer) in the network.

It should be appreciated that the generating action at blocks 1060 and 1070 can comprise generating connectivity information associated with one or more pathways between a first end of a link and a second end of the link, as described herein.

Figure 11:
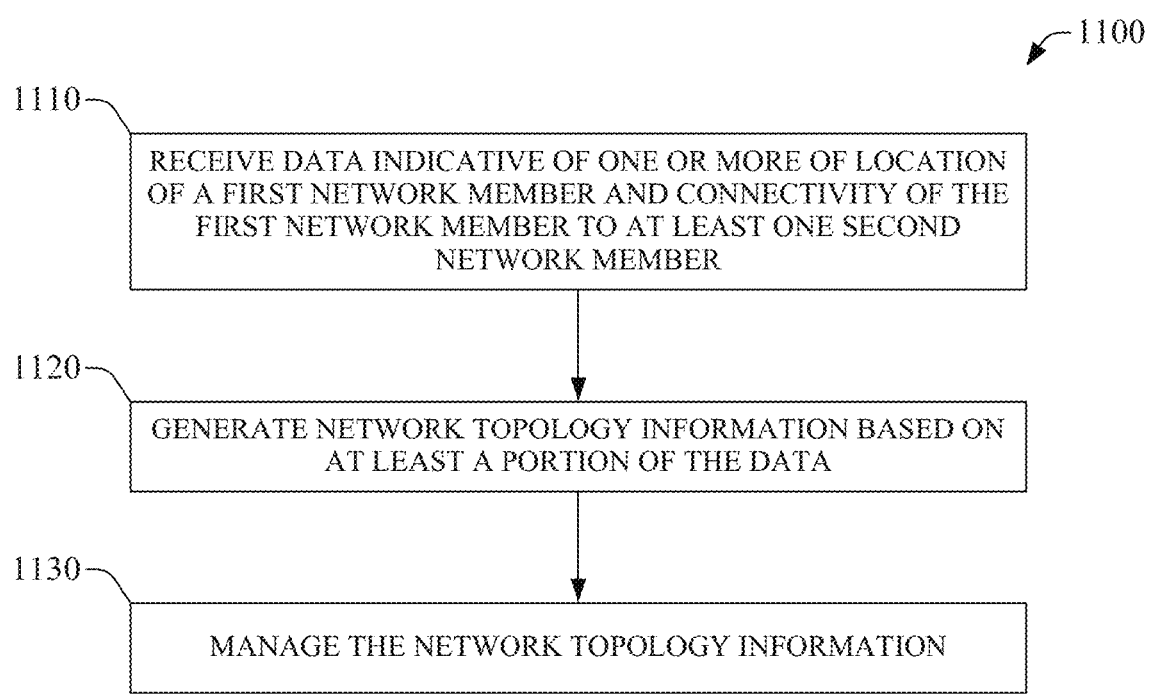
FIG. 11 is a flowchart illustrating an another example method in accordance with one or more aspects of the disclosure.

FIG. 11 is a flowchart of an exemplary method 1100 for providing network topology information in accordance with one or more aspects of the disclosure. One or more blocks of the exemplary method 900 can be implemented (e.g., performed or executed) by a computing device, such as the topology server 344, or a processor integrated therein or functionally coupled thereto. At block 1110, data indicative of one or more of location of a first network member and/or connectivity of the first network member to at least one second network member (e.g., a set-top box) is received. In one aspect, the first network member can be contained in a first network device (e.g., a cable modem) and a second network member of the at least one second network member can be contained in a second network device (e.g., a set-top box). At block 1120, network topology information is generated based on at least a portion of the data.

At block 1130, the network topology information is managed. Block 1130 can be referred to as a managing action and, in one aspect, can comprise transmitting at least the portion of the network topology information to a computing device functionally coupled to a network (e.g., network 190) comprising at least the first network member. In one embodiment, the computing device can be contained in an external network (e.g., external network 195). Thus, transmitting such information to the computing device can comprise transmitting at least the portion of the network topology information to the external network. In another embodiment, the computing device can be contained in a higher network layer of the network comprising at least the first network member, thus transmitting such information to the computing device can comprise transmitting at least the portion of the network topology information to the higher network layer.

Figure 12:
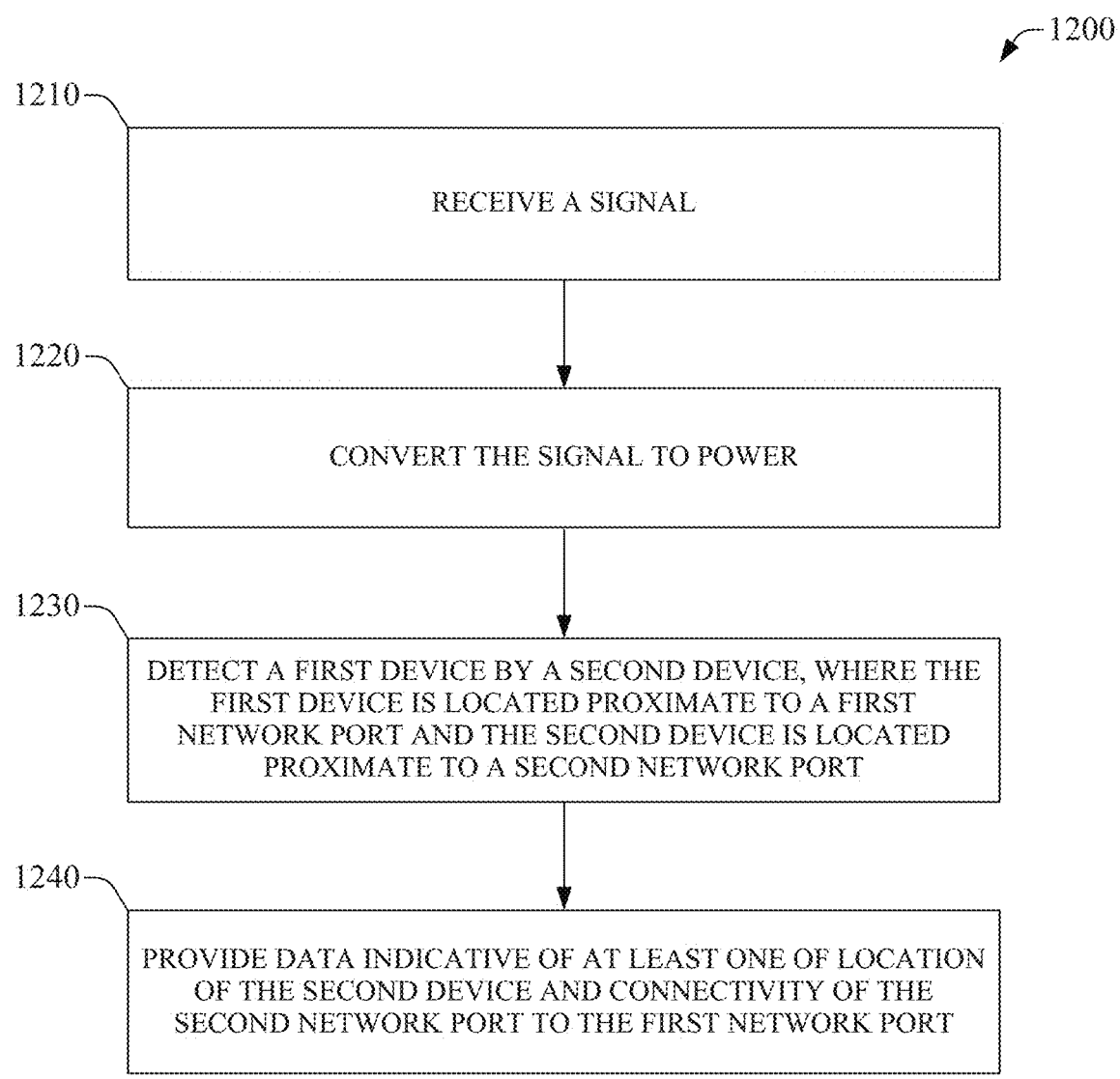
FIG. 12 is a flowchart illustrating an another example method in accordance with one or more aspects of the disclosure.

FIG. 12 is a flowchart of an exemplary method 1200 for providing topology information. As part of the method 1200, several devices (e.g., a first device, a second device, and a third device) can be in communication. For example, each of the devices can be assigned, at least for a time, to a logical address in a network. In one aspect, the logical address can be an internet protocol version 4 or internet protocol version 6 address. At block 1210, a signal can be received to the second device from the third device. As an example, the signal can be a wireless signal. At block 1220, the signal can be converted to power for the second device. For example, the signal can be converted to power through electromagnetic induction. In one aspect, one or more of the first device, second device, and third device can comprise a radio frequency identification device (RFID).

At block 1230, a first device can be detected by a second device. In one aspect, the first device can be located proximate to a first network port, and the second device can be located proximate to a second network port. The first network port and second network port can be located on a wire or other device (e.g., router, network card). Additionally, the first network port and the second network port can be configured to form a network connection. For example, one of the first network port and second network port can be a male plug and the other can be a female connector configured to receive the plug. In another aspect, the first network port and second network port can each be a used connector of the network, a non-used connector of the network, a used port of the network, or a non-used port of the network. For example, a used connector can be a port or connector coupled to another port or connector such that network communication is enabled. A non-used connector can be a port or connector not connected to another port or connector. The first device and the second device can be separately coupled (e.g., attached, glued, embedded) to one or more of user equipment, customer premises equipment, a server, a data storage, a connection link, and the like.

At block 1240, data can be provided indicative of at least one of, location of the second device and connectivity of the second network port through the network connection to the first network port. For example, data can be collected and stored on the second device. In one aspect, data can comprise global positioning system information, a history of interactions (e.g., network connectivity) with other devices, and the like. In one aspect, the data can be provided as part of the topology information described above. As an example, the data can be provided to a device (e.g., the third device, a server) configured to generate topology information based on the data. The topology information can be about the first device, second device, and a plurality of other devices. The topology information can comprise, for example, a connectivity map comprising data indicative of presence or absence of a connection among at least two devices (e.g., the first device and second device) of the plurality of devices. In one aspect, the connection can be one of a physical connection or a logical connection.

In view of the subject specification and annexed drawings, when compared with conventional approaches for generation of network topology information and management thereof, various advantages emerge. For example, one embodiment of the disclosure can provide access to connectivity information associated with all or most all tagged equipment at a consumer site (e.g., a residential customer site or a commercial customer site). As a result, the disclosure can permit addressing operational issues expeditiously, with ensuing reduction of cost and time associated with network service, and increased quality of customer service and increased customer satisfaction. For another example, another embodiment of the disclosure can permit integration of network topology information with administrative network layers, thus permitting remote assessment of network performance, with the ensuing reduction of costs associated with visitation of a field facility (e.g., a hub, an aggregator site, a base station site, or the like) for assessment and maintenance. For yet another example, other embodiments of the disclosure can permit monitoring of asset connectivity (e.g., fiber optic connectivity) in nearly real-time, according to a predetermined schedule, or in response to specific events, such as deployment changes in a network comprising tagged assets in accordance with aspects of the disclosure, or delivery of a status paging message to a specific portions of the network.

In certain embodiment(s), one or more of the disclosed systems, apparatuses, or devices can implement one or more features of the of the disclosure by applying artificial intelligence (AI) techniques, such as machine learning and iterative learning, to generate an inference. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification and annexed drawings, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   receiving data from a current plurality of wireless devices,
      wherein at least one of the current plurality of wireless devices is coupled to a selected location in a network, and wherein the data comprises location data identifying a corresponding location in the network for each of the current plurality of wireless devices;

comparing at least a portion of the location data of the current plurality of wireless devices to at least a portion of location data received from a previously detected plurality of wireless devices;

determining, based on the comparison, if the current plurality of wireless devices has an additional device with respect to the previously detected plurality of wireless devices;

generating a network topology of the current plurality of wireless devices based at least on a portion of the data from the current plurality of wireless devices in response to determining that the current plurality of wireless devices does have the additional device with respect to the previously detected plurality of wireless devices; and transmitting topology data indicative of at least a portion of the network topology to a network node.

2. The method of claim 1, wherein determining, based on the comparison, if the current plurality of wireless devices has the additional device with respect to the previously detected plurality of wireless devices comprises determining an update to data associated with the previously detected plurality of wireless devices at a topology server configured to store topology information for servicing the network.

3. The method of claim 1, wherein determining, based on the comparison, if the current plurality of wireless devices has the additional device with respect to the previously detected plurality of wireless devices comprises determining that a portion of the location data of the current plurality of wireless devices does not match the location data of the previously detected plurality of wireless devices.

4. The method of claim 1, wherein the data from the current plurality of wireless devices comprises identification information identifying the current plurality of wireless devices, and wherein determining, based on the comparison, if the current plurality of wireless devices has the additional device with respect to the previously detected plurality of wireless devices comprises determining that the identification information does not match identification information of the previously detected plurality of wireless devices.

5. The method of claim 1, wherein the data from the current plurality of wireless devices comprises data indicative of one or more of a location of a first wireless device of the current plurality of wireless devices and connectivity of the first wireless device to a second wireless device of the current plurality of wireless devices.

6. The method of claim 1, wherein the topology data comprises data indicative of each location of each one of the current plurality of wireless devices.

7. A method, comprising:

receiving data from a current plurality of wireless devices, wherein at least one of the current plurality of wireless devices is coupled to a selected location in a network;

determining a failure to receive data from an additional device of a previously detected plurality of wireless devices;

determining, based on the determined failure, that the current plurality of wireless devices does not have the additional device of the previously detected plurality of wireless devices;

generating a network topology representing the previously detected plurality of wireless devices based at least on a portion of the data in response to determining that the current plurality of wireless devices does not have the additional device with respect to the previously detected plurality of wireless devices; and transmitting topology data indicative of at least a portion of the network topology to a network node.

8. The method of claim 7, wherein determining the failure to receive the data from the additional device of the previously detected plurality of wireless devices comprises determining the additional device did not respond to a poll requesting data.

9. The method of claim 7, wherein the data from the current plurality of wireless devices comprises location data identifying corresponding locations of the current plurality of wireless devices, and wherein determining the failure to receive the data from the additional device of the previously detected plurality of wireless devices comprises determining that the location data of the current plurality of wireless devices does not match location data of the previously detected plurality of wireless devices.

10. The method of claim 7, wherein the data from the current plurality of wireless devices comprises identification information identifying the current plurality of wireless devices, and wherein determining the failure to receive the data from the additional device of the previously detected plurality of wireless devices comprises determining that identification information does not match identification information of the previously detected plurality of wireless devices.

11. The method of claim 7, wherein the network topology comprises a connectivity map comprising data indicative of presence or absence of a connection among at least two wireless devices of the previously detected plurality of wireless devices, wherein the connection is one of a physical connection or a network connection.

12. The method of claim 7, wherein each wireless device of the previously detected plurality of wireless devices is associated with a respective internet protocol version 6 address.

13. The method of claim 7, wherein each wireless device of the current plurality of wireless devices comprises a respective radio frequency identification (RFID) device.

14. A system, comprising:

a memory comprising computer-executable instructions; and a processor functionally coupled to the memory and configured, by the computer-executable instructions, to perform at least the following actions, receiving data from a current plurality of wireless devices, wherein at least one of the current plurality of wireless devices is coupled to a selected location in a network, determining a failure to receive data from an additional device of a previously detected plurality of wireless devices, determining, based on the determined failure, that the current plurality of wireless devices does not have the additional device of the previously detected plurality of wireless devices, generating a network topology representing the previously detected plurality of wireless devices based at least on a portion of the data in response to determining that the current plurality of wireless devices does not have the additional device with respect to the previously detected plurality of wireless devices, and transmitting topology data indicative of at least a portion of the network topology to a network node.

15. The system of claim 14, wherein determining the failure to receive the data from the additional device of the previously detected plurality of wireless devices comprises determining the additional device did not respond to a poll requesting data.

16. The system of claim 14, wherein the data from the current plurality of wireless devices comprises location data identifying corresponding locations of the current plurality of wireless devices, and wherein determining the failure to receive the data from the additional device of the previously detected plurality of wireless devices comprises determining that the location data of the current plurality of wireless devices does not match location data of the previously detected plurality of wireless devices.

17. The system of claim 14, wherein the data from the current plurality of wireless devices comprises identification information identifying the current plurality of wireless devices, and wherein determining the failure to receive the data from the additional device of the previously detected plurality of wireless devices comprises determining that identification information does not match identification information of the previously detected plurality of wireless devices.

18. The system of claim 14, wherein the network topology comprises a connectivity map comprising data indicative of presence or absence of a connection among at least two wireless devices of the previously detected plurality of wireless devices, wherein the connection is one of a physical connection or a network connection.

19. The system of claim 14, wherein each wireless device of the previously detected plurality of wireless devices is associated with a respective internet protocol version 6 address.

20. The system of claim 14, wherein each wireless device of the current plurality of wireless devices comprises a respective radio frequency identification (RFID) device.

* * * * *